(12) United States Patent
Hashimoto

(10) Patent No.: US 12,164,821 B2
(45) Date of Patent: Dec. 10, 2024

(54) PRINTING SYSTEM THAT PROVIDES VIRTUAL SPACE AND RECEIVES PRINT CONTENT EXIST IN VIRTUAL SPACE, HEAD-MOUNTED DISPLAY DEVICE, PRINTING METHOD, AND NON-TRANSITORY COMPUTER-READABLE STORAGE MEDIUM

(71) Applicant: CANON KABUSHIKI KAISHA, Tokyo (JP)

(72) Inventor: Tatsuya Hashimoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/512,116

(22) Filed: Nov. 17, 2023

(65) Prior Publication Data

US 2024/0176565 A1    May 30, 2024

(30) Foreign Application Priority Data

Nov. 24, 2022  (JP) .................................. 2022-187594

(51) Int. Cl.
  *G06F 3/12* (2006.01)
  *G06F 3/01* (2006.01)
  *G06F 3/04815* (2022.01)
  *G06F 3/06* (2006.01)

(52) U.S. Cl.
  CPC ............ *G06F 3/1285* (2013.01); *G06F 3/011* (2013.01); *G06F 3/04815* (2013.01); *G06F 3/1206* (2013.01); *G06F 3/1237* (2013.01); *G06F 3/0643* (2013.01)

(58) Field of Classification Search
  None
  See application file for complete search history.

(56) References Cited

U.S. PATENT DOCUMENTS

| | | | |
|---|---|---|---|
| 10,795,627 B1 | 10/2020 | Nakamura | |
| 11,609,428 B2 * | 3/2023 | Inatani | ..................... G06F 3/038 |
| 2014/0232747 A1 * | 8/2014 | Sugimoto | ............... G06T 11/00 |
| | | | 345/633 |
| 2014/0293329 A1 * | 10/2014 | Shimizu | .................. G06T 11/00 |
| | | | 358/1.15 |
| 2016/0344882 A1 * | 11/2016 | Tsujioka | ............ H04N 1/00493 |
| 2017/0048405 A1 * | 2/2017 | Park | ..................... H04N 1/32609 |
| 2022/0335700 A1 * | 10/2022 | Watanabe | .......... H04N 21/8146 |

FOREIGN PATENT DOCUMENTS

JP       2020182213 A       11/2020

* cited by examiner

*Primary Examiner* — Haris Sabah
(74) *Attorney, Agent, or Firm* — ROSSI, KIMMS & McDOWELL LLP

(57) ABSTRACT

A printing system including a provision system that provides a virtual space, a user device for experiencing the virtual space, and a printing apparatus, wherein: the provision system has a reception unit configured to receive operations to print contents corresponding to objects that exist in the virtual space in accordance with operations that the user has executed in the virtual space; the user device has an output unit configured to externally output print data corresponding to the contents in response to an operation to print the contents having been received by the reception unit; and the printing apparatus has a print control unit configured to print the contents by acquiring the print data in response to the operation to print the contents.

9 Claims, 27 Drawing Sheets

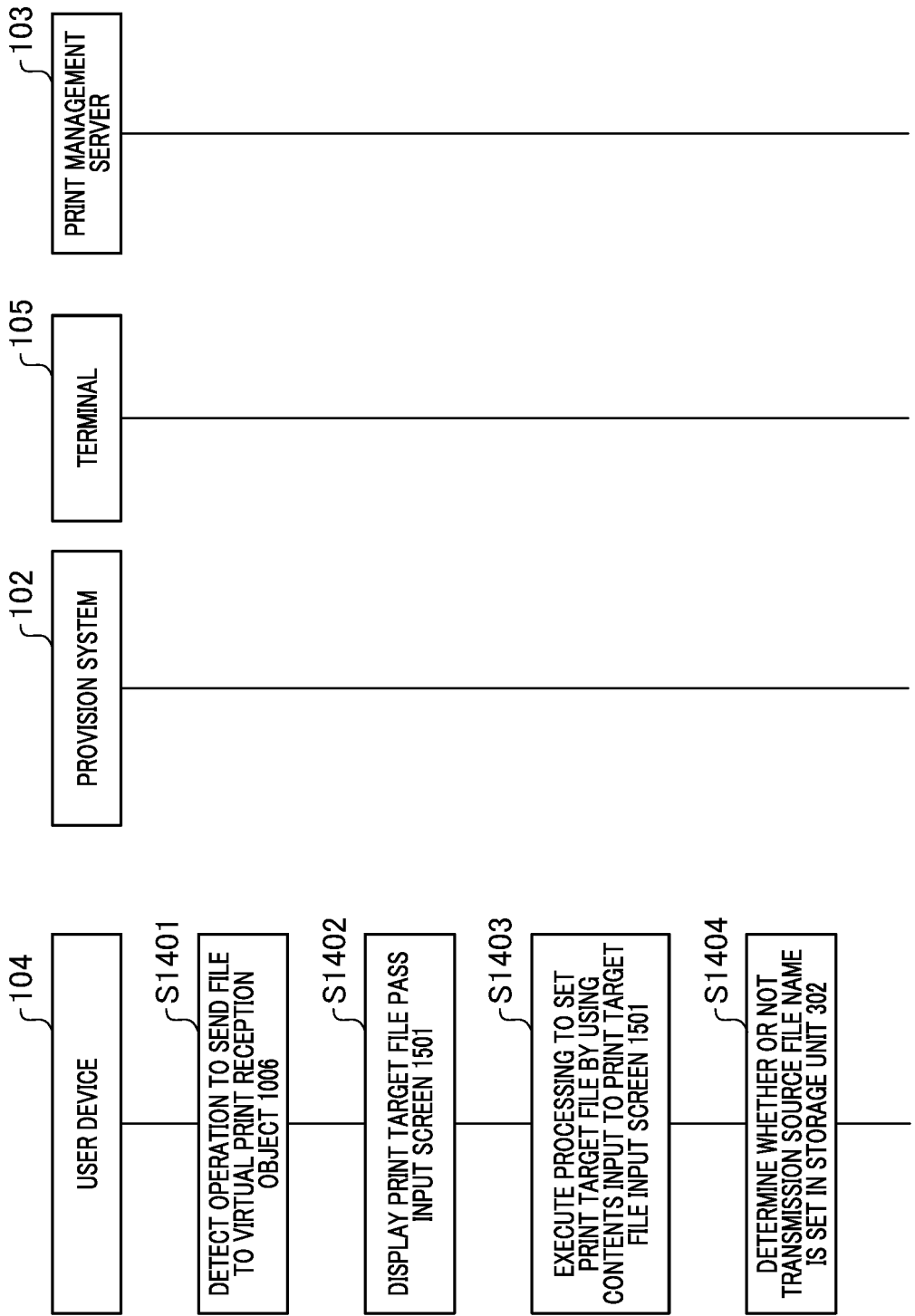

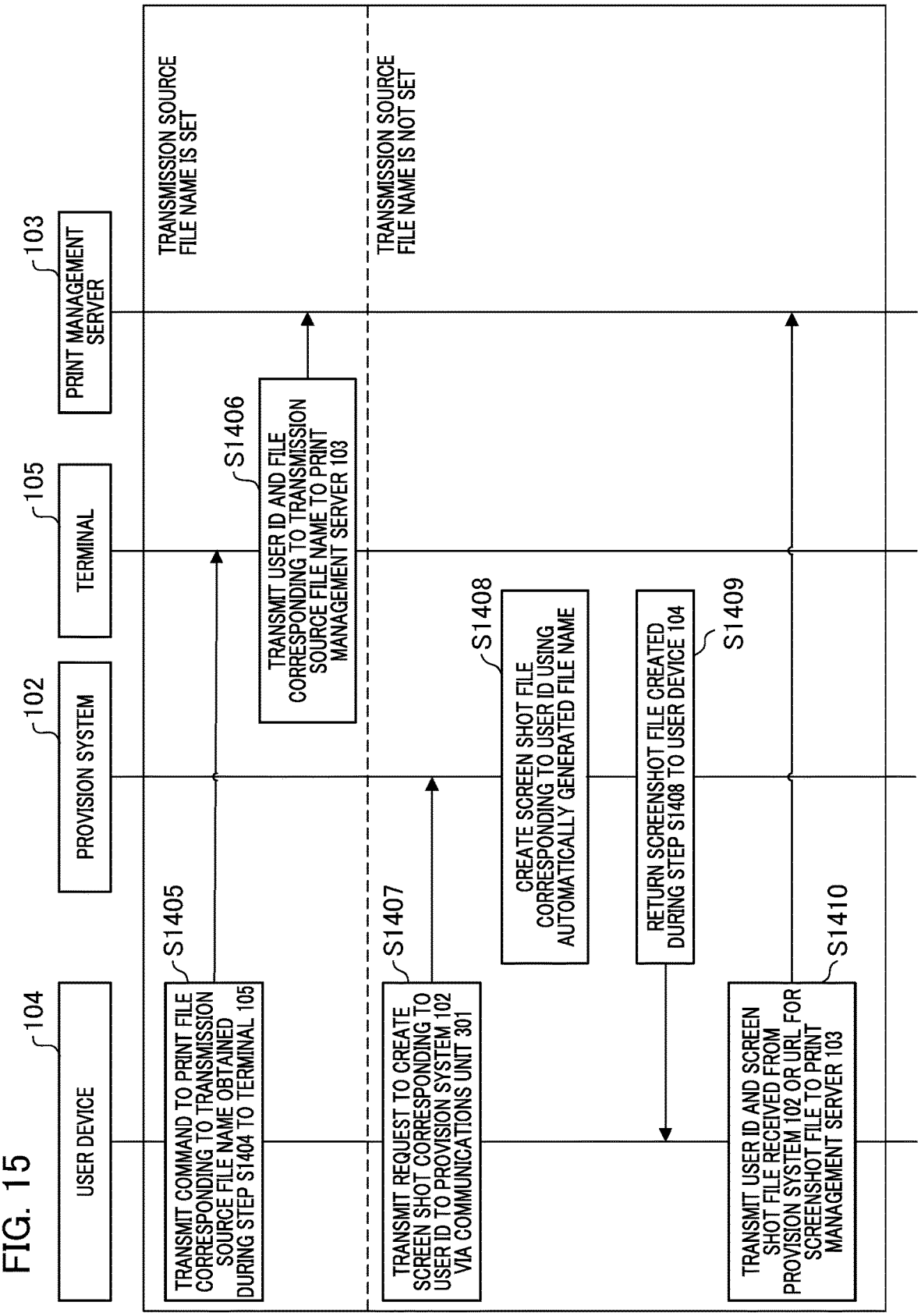

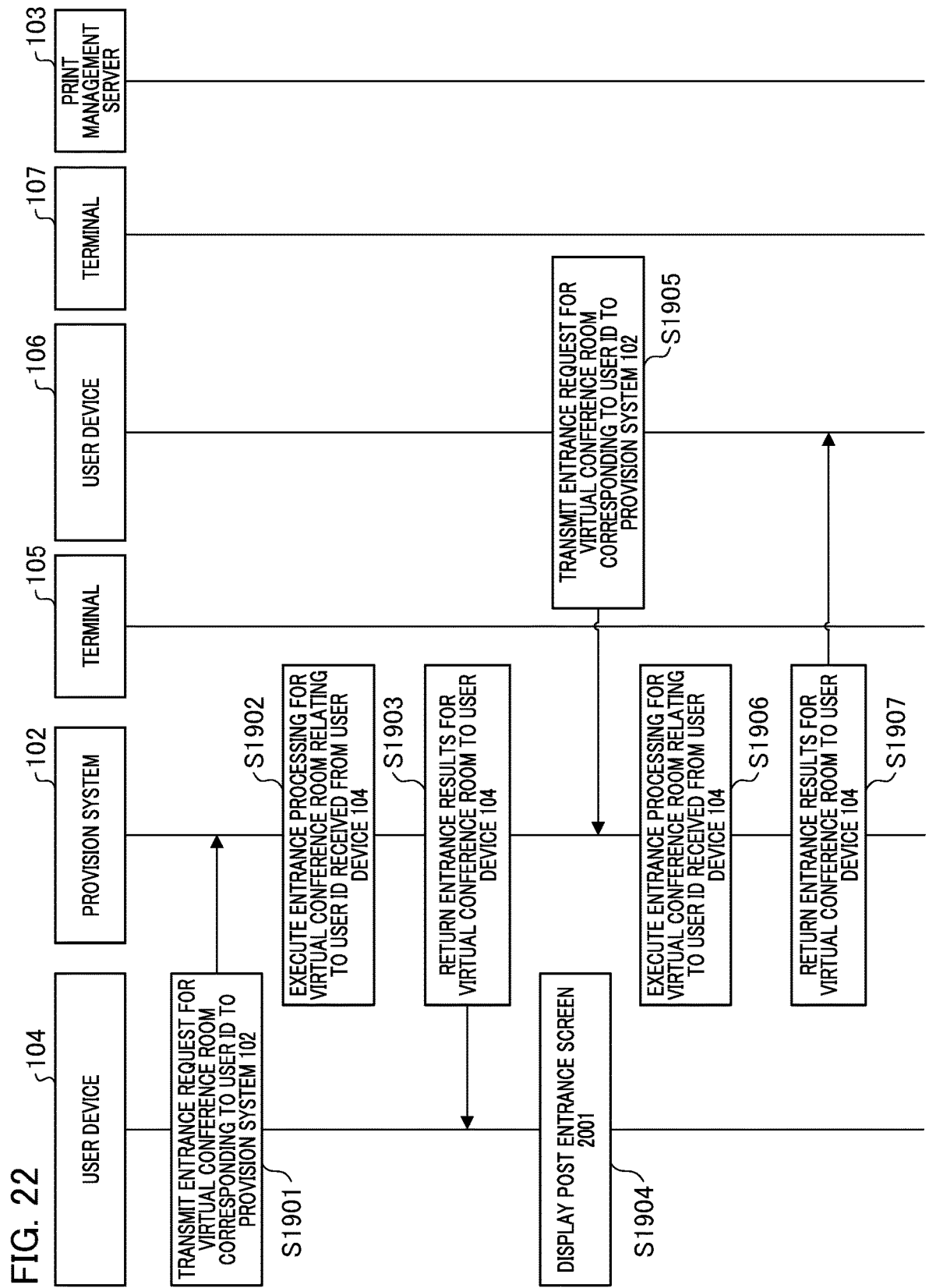

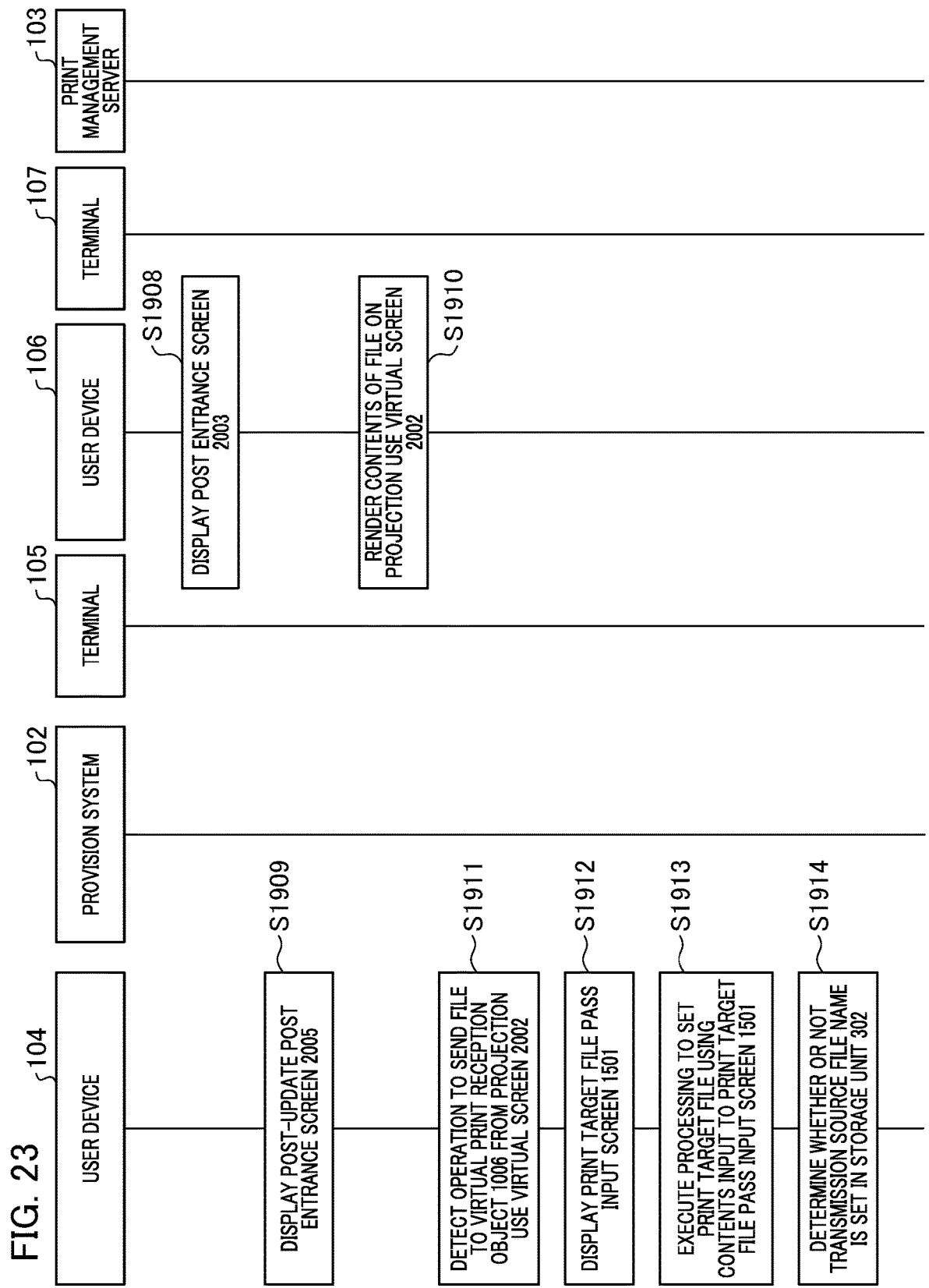

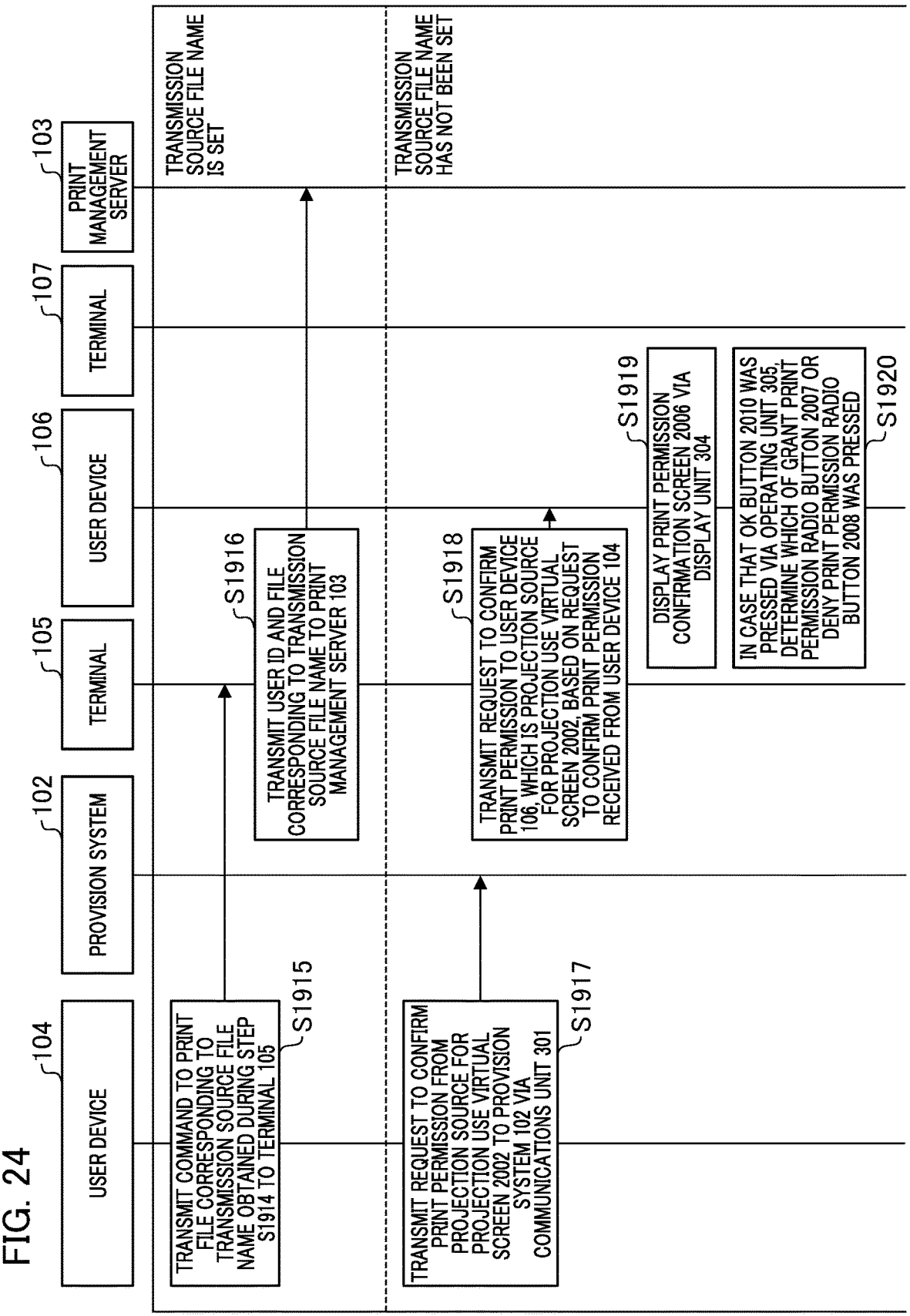

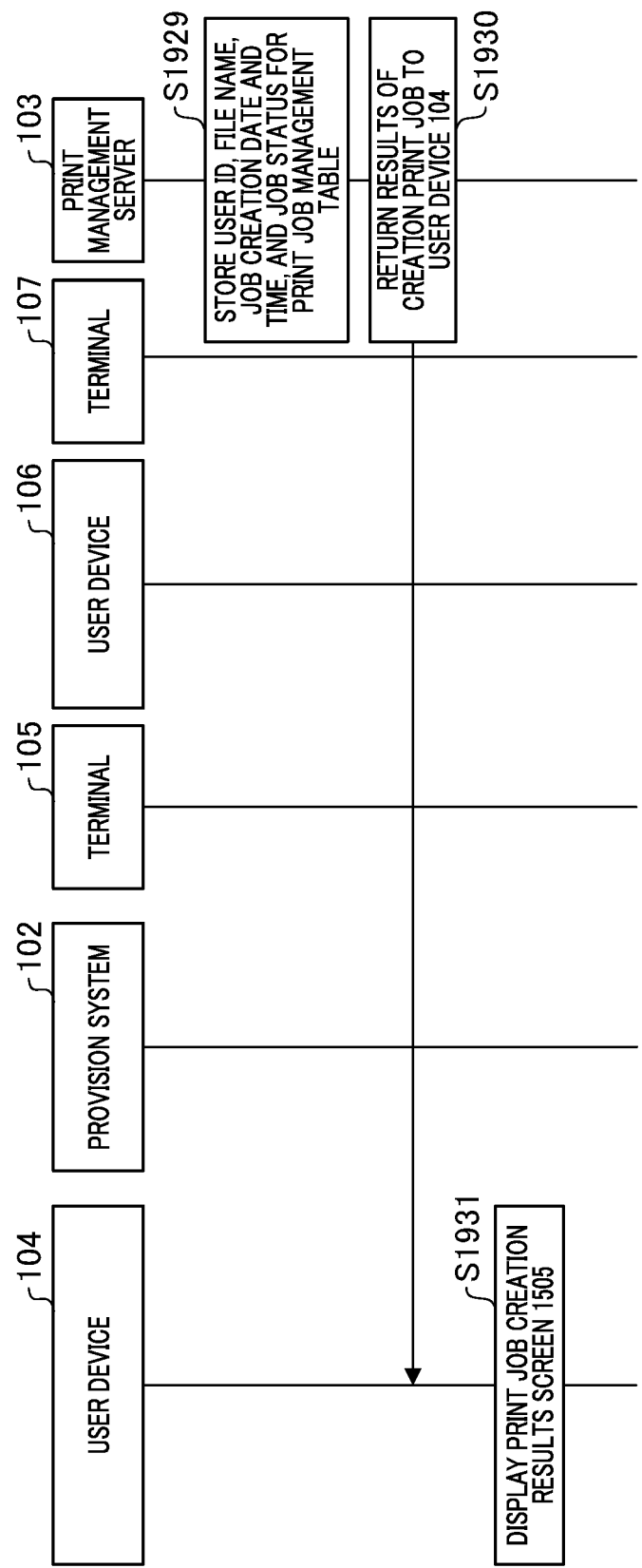

PRINTING SYSTEM THAT PROVIDES VIRTUAL SPACE AND RECEIVES PRINT CONTENT EXIST IN VIRTUAL SPACE, HEAD-MOUNTED DISPLAY DEVICE, PRINTING METHOD, AND NON-TRANSITORY COMPUTER-READABLE STORAGE MEDIUM

BACKGROUND OF THE INVENTION

Field of the Invention

The present invention relates to a printing system, a printing method, a storage medium, and the like.

Description of Related Art

Currently, in accordance with the expansion of metaverse technology, attempts to use metaverse technology in the field of business, such as virtual meetings held in virtual spaces, workspaces that are provided in virtual spaces, and the like are progressing. In accordance with this, it is predicted that the need for users to print contents in the virtual space, and print these contents using a printer that is placed in an actual space will be born.

In addition, hardware and software that answer such needs are being developed. For example, a head-mounted display that is able to acquire a screenshot of the image that it is displaying is known.

In addition, for example, software that displays an image that is being displayed on a head-mounted display on a display of a terminal that is connected to the head-mounted display is also known. Furthermore, Japanese Unexamined Patent Application, First Publication No. 2020-182213 discloses an image forming system that accumulates necessary information, and is able to print information even if the battery of a portable terminal dies.

However, although the image forming system that is disclosed in Japanese Unexamined Patent Application, First Publication No. 2020-182213 is able to pull print a screenshot file, it is not able to pull print a file body.

In addition, in the case of a terminal that is not associated with the user who is using the head-mounted display, there are cases in which the account that is associated with the server and the account for the above-described software are different.

In this case, even if the contents that the user would like to print are sent to a print reception object in the virtual space, these contents cannot be printed.

SUMMARY OF THE INVENTION

In order to solve the above-described problems, the print system according to one aspect of the present invention is a printing system including a provision system configured to provide a virtual space, a user device for a user to experience the virtual space, and a printing apparatus, wherein: the provision system has at least one processor or circuit configured to function as: a reception unit configured to receive operations to print contents corresponding to objects that exist in the virtual space in accordance with operations that the user has executed in the virtual space; the user device has at least one processor or circuit configured to function as: an output unit configured to externally output print data corresponding to the contents in response to the operation to print the contents having been received by the reception unit; and the printing apparatus has at least one processor or circuit configured to function as: a print control unit configured to print the contents by acquiring the print data in response to the operation to print the contents.

Further features of the present invention will become apparent from the following description of embodiments with reference to the attached drawings.

BRIEF DESCRIPTION OF THE DRAWINGS

FIG. 14 is a diagram showing an example of processing that is executed between the user device, the provision system, the terminal, and the print management server, or two from among these according to the First Embodiment.

FIG. 15 is a diagram showing an example of processing that is executed between the user device, the provision system, the terminal, and the print management server, or two from among these according to the First Embodiment.

FIG. 22 is a sequence diagram showing an example of processing that is executed by the printing system according to the Second Embodiment.

FIG. 23 is a sequence diagram showing an example of processing that is executed by the printing system according to the Second Embodiment.

FIG. 24 is a sequence diagram showing an example of processing that is executed by the printing system according to the Second Embodiment.

FIG. 26 is a sequence diagram showing an example of processing that is executed by the printing system according to the Second Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

<Configuration of the Printing System in the Virtual Space>

Figure 1:
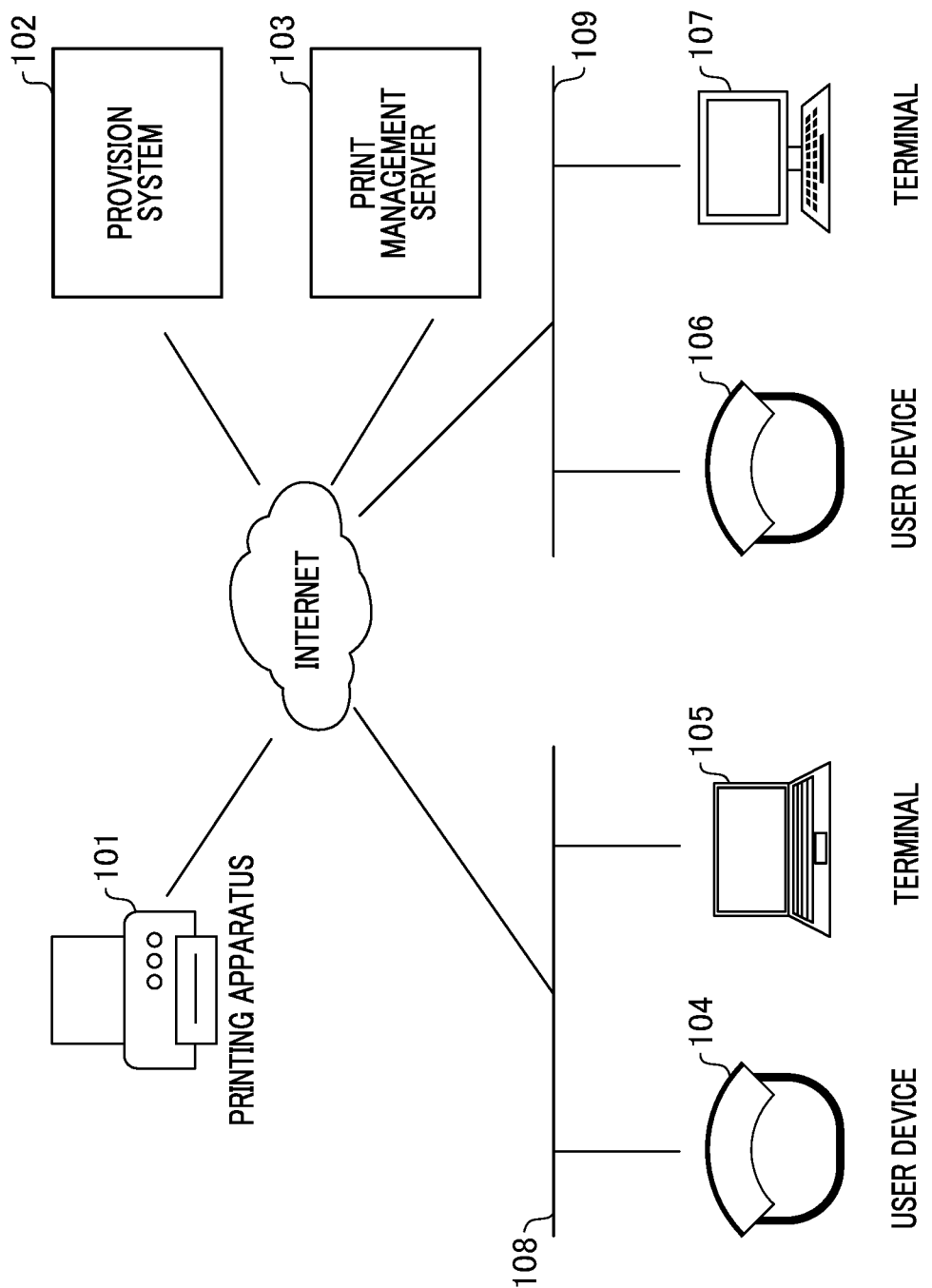
FIG. 1 is a diagram showing an example of a printing system according to a First Embodiment.

FIG. 1 is a diagram showing an example of a printing system according to the First Embodiment. As is shown in FIG. 1, the printing system according to the First Embodiment is provided with a printing apparatus 101, a provision system 102, a print management server 103, a user device 104, a terminal 105, a user device 106, and terminal 107.

The printing apparatus 101 is an apparatus that prints contents such as images or the like, and may also have functions other than printing, such as scanning or the like. The provision system 102 is, for example, a server, and provides a virtual space to a user of the user device 104, the user device 106, or the like.

The print management server 103 manages jobs in which the printing apparatus 101 prints contents. As is shown in FIG. 1, the printing apparatus 101, the provision system 102, and the print management server 103 are all connected to the internet, and are able to communicate via the internet. These communications accompany a control through HTTP (Hypertext Transfer Protocol), XMPP (Extensible Messaging and Presence Protocol), or the like.

The user device 104 and the user device 106 are, for example, head-mounted displays that allow a user to experience a virtual space, and are hardware that output a video image of a virtual space, a virtual object that exists in this virtual space, or the like.

The terminal 105 and the terminal 107 are, for example, a computer, a smartphone, or a tablet. The terminal 105 is associated with a user. The terminal 107 is also associated with a user in the same manner.

As is shown in FIG. 1, the user device 104 and the terminal 105 are connected to the internet via a network 108 such as a LAN (Local Area Network), WAN (Wide Area Network), or the like.

Therefore, the user device 104 and the terminal 105 are able to communicate via the network 108 and the internet. In addition, as is shown in FIG. 1, the user device 106 and the terminal 107 are connected to the internet via a network 109 such as LAN, a WAN, or the like.

Therefore, the user device 106 and the terminal 107 are able to communicate via the network 109 and the internet. These communications accompany a control through HTTP, XMPP, or the like.

In addition, the user device 104 determines whether or not contents exist in the terminal 105 that is associated with the user. In addition, in a case in which it has been determined that contents do not exist on the terminal 105, the user device 104 acquires a screenshot of these contents from the provision system 102, and outputs print data showing the screenshot to the print management system that manages print data.

In contrast, in a case in which it has been determined that these contents exist on the terminal, the user device 104 transmits a print job of these contents to the terminal 105. Then, the terminal 105 outputs print data showing these contents to the print management system that manages print data.

In the same manner, the user device 106 determines whether or not contents exist on the terminal 107 that is associated with user. In addition, in the case in which it has been determined that the contents do not exist on the terminal 107, the user device 106 acquires a screenshot of these contents from the provision system 102, and outputs print data showing the screenshot to the print management system that manages print data.

In contrast, in a case in which it has been determined that these contents exist on the terminal, the user device 106 transmits a print job of these contents to the terminal 107. Then, the terminal 107 outputs print data showing these contents to the print management system that manages print data.

<Hardware Configuration of the User Devices and Terminals>

Figure 2:
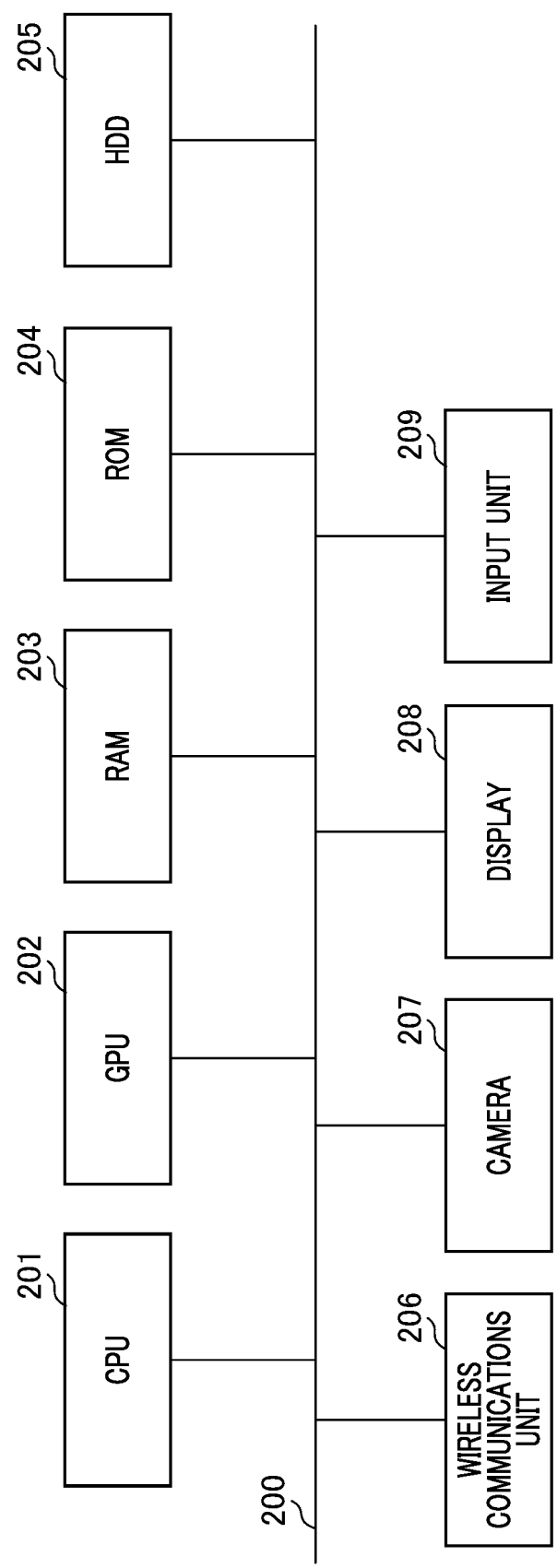
FIG. 2 is a diagram showing an example of a hardware configuration for a user device and a terminal according to the First Embodiment.

FIG. 2 is a diagram showing an example of a hardware configuration of a user device and a terminal according to the First Embodiment.

The user device 104, the terminal 105, the user device 106, and the terminal 107 are provided with a CPU (Central Processing Unit) 201, a GPU (Graphics Processing Unit) 202, a RAM (Random Access Memory) 203, a ROM (Read Only Memory) 204, an HDD (Hard Disk Drive) 205, a radio communications unit 206, a camera 207, and a display 208 that are shown in FIG. 2.

The CPU 201 controls the entirety of the apparatus. In addition, the CPU 201 executes application programs, an OS (Operating System), and the like. The GPU 202 executes processing that is necessary in order to render a virtual space, objects that exist in this virtual space, and the like in real time.

The RAM 203 is a storage medium on which programs that are executed by the CPU 201 and the GPU 202 are temporarily decompressed, and functions as the main memory, work area, and the like of the CPU 201 and the GPU 202.

The ROM 204 is a storage medium and stores each type of data such as a basic I/O (Input/Output) program and the like. The HDD 205 is a large capacity storage medium that has been externally attached to an apparatus, and stores application programs such as a web browser or the like, programs for service server groups, an OS, programs related to these, and the like.

The radio communications unit 206 is connected to a network such as the internet or the like, and executes each type of communications. The camera 207 captures video images of the apparatus's surroundings.

In a case in which the apparatus is the user device 104 or the user device 106, the display 208 displays a virtual space, virtual objects that exist in this virtual space, information necessary for operations by the user of this apparatus, or the like.

In addition, in a case in which the apparatus is the user device 104 or the user device 106, the display 208 may also be provided with a left-eye display and a right-eye display. The left-eye display displays a video image that is perceived by the left eye of the user of the user device 104 and the user device 106.

In contrast, the right-eye display displays a video image that is perceived by the right eye of the user of the user device 104 or the user device 106. The display 208 is thereby able to make the user perceive a three-dimensional video image.

Conversely, the display 208 may also be provided with a half mirror. In a case in which the display 208 is provided with a half mirror, the user is made to view a three-dimensional video image by having the user view a virtual screen that is positioned in front of the half mirror.

Conversely, in the case in which the display 208 is provided with a laser irradiation apparatus, the user is made to view a three-dimensional video image by the laser that has been irradiated from the laser irradiation apparatus being projected onto the retina of the user.

Note that even in a case in which the display 208 causes the user to perceive a three-dimensional image, the terminal 105 and the terminal 107 two-dimensionally display the virtual space, virtual objects that exist in this virtual space, information that is necessary for operations by the user of this apparatus, and the like, including overlaps.

The input unit 209 inputs information to the apparatus. In the case in which the apparatus is the user device 104 or the user device 106, the input unit 209 is a microphone, a controller, an accelerometer, a touch sensor, and an infrared camera sensor. The microphone and controller are used in operations inside of the virtual space. The accelerometer, touch sensor, and infrared camera sensor are associated with the user, and are used to control the position, movements and the like of an avatar that operates in the virtual space.

<Software Configuration of the User Devices and Terminals>

Figure 3:
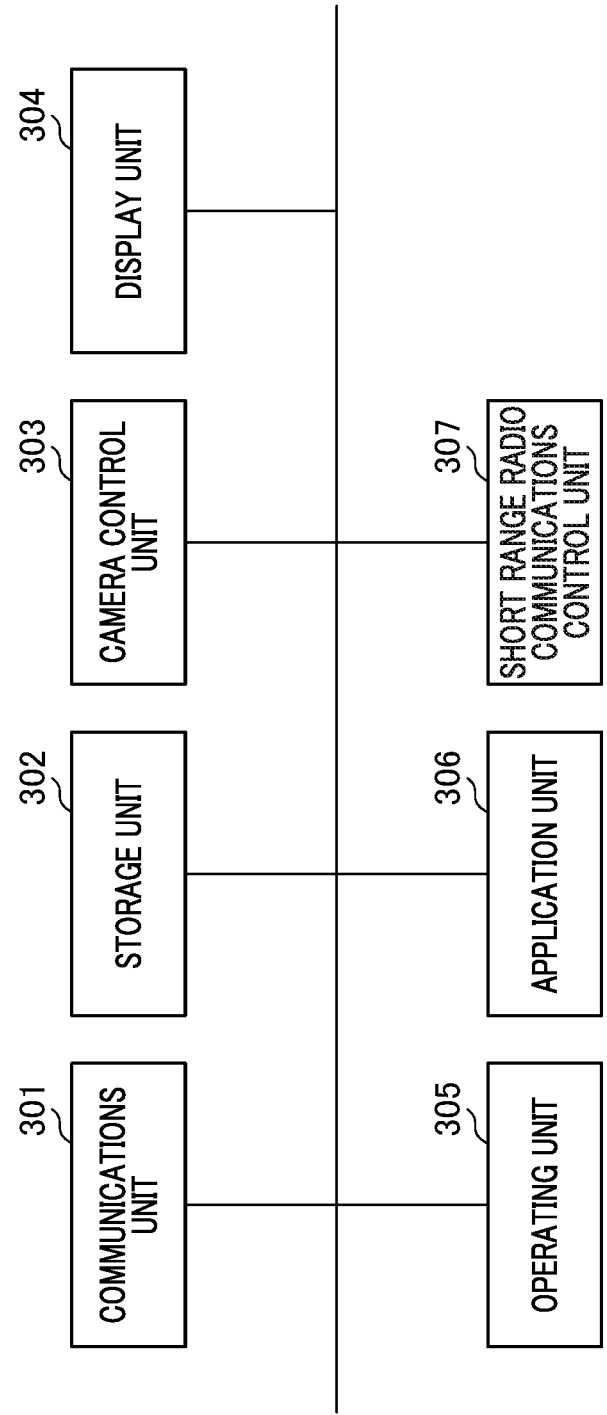
FIG. 3 is a diagram showing an example of a software configuration for a user device and a terminal according to the First Embodiment.

FIG. 3 is a diagram showing an example of a software configuration of a user device and a terminal according to the First Embodiment.

The user device 104, the terminal 105, the user device 106, and the terminal 107 have a communications unit 301, a storage unit 302, a camera control unit 303, a display unit 304, an operating unit 305, an application unit 306, and a short range radio communications control unit 307, which are shown in FIG. 3.

In addition, these are saved on the above-described ROM 204 as programs, and are decompressed on the RAM 203 when being executed by the CPU 201.

The communications unit 301 executes communications via a network. In addition, the communications unit 301 also functions as an output unit configured to externally output print data corresponding to contents according to an operation for printing these contents having been received by a reception unit that will be described below.

The output unit outputs print data to, for example, the print management server 103, which is one example of a print management system that manages print data. In addition, the print data includes data showing a video image corresponding to the virtual space experienced by the user using the user device 104 or the user device 106.

The storage unit 302 executes processing for storing an OS, a web browser, an application, and the like that are used by the apparatus on the ROM 204. The camera control unit 303 controls a camera that is mounted on the apparatus. The display unit 304 controls the display 208 such that an image that is generated by the OS, the web browser, the application, and the like being executed is displayed. Examples of such an image are, for example, a menu that is used in operations of the OS.

The operating unit 305 receives and controls, for example, operations to the apparatus by the input unit 209, operations by the microphone or controller, and operations of the user that have been detected by the accelerometer, touch sensor, or infrared camera sensor. For example, in a case in which the apparatus has been double tapped, the operating unit 305 closes the application, and displays the web browser on the display 208.

In addition, in a case in which the apparatus has been double tapped, the operating unit 305 uses a technology such as augmented reality (AR) or the like, and performs control such that a menu for the OS is projected onto an image of the real space that has been acquired by the camera control unit 303. In addition, the operating unit 305 performs control such that that this menu is opened in a case in which this menu has been tapped.

The application unit 306 controls applications that have been installed on the OS for the apparatus. In addition, the application unit 306 stores user information that is handled by the application, code information for identifying data, and the like on the ROM 204 in coordination with the storage unit 302.

The short range radio communications control unit 307 controls the radio communications unit 206, acquires information related to peripheral devices using local communications, and executes communications with the peripheral devices. In addition, in a case in which short range radio communication from the application has been performed, the short range radio communications control unit 307 executes communications with peripheral devices in coordination with the application unit 306.

<Hardware Configuration for the Printing Apparatus>

Figure 4:
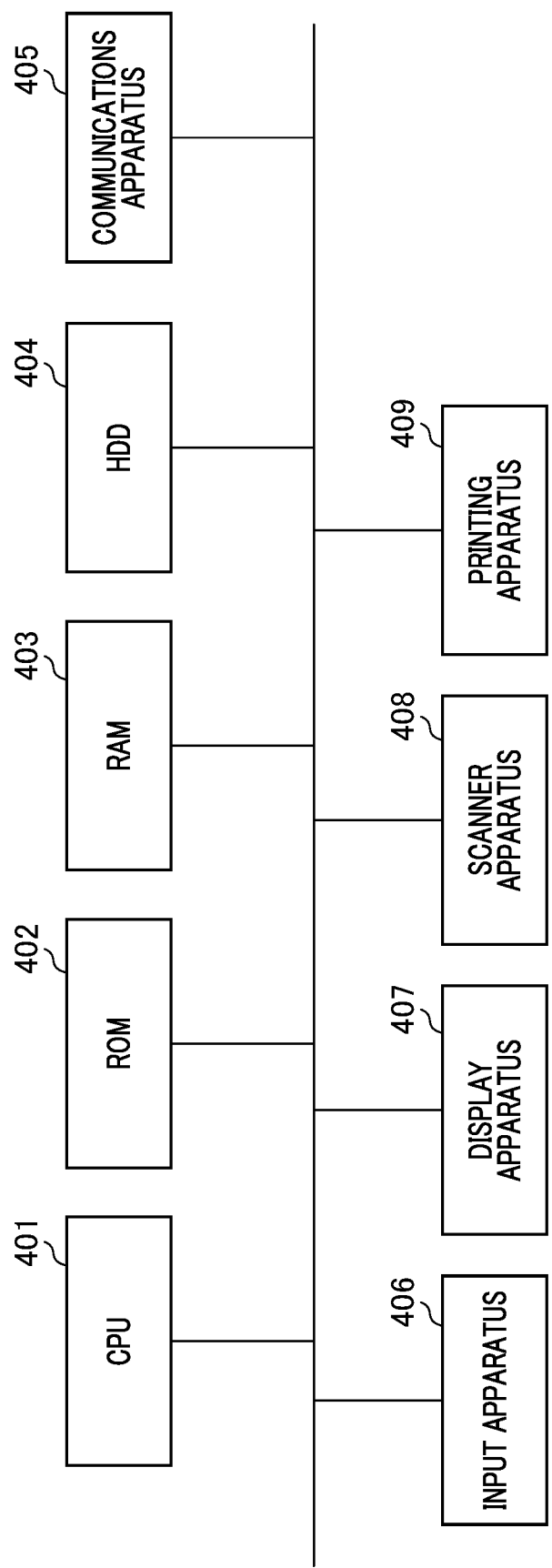
FIG. 4 is a diagram showing an example of a hardware configuration for a printing apparatus according to the First Embodiment.

FIG. 4 is a diagram showing an example of a hardware configuration of the printing apparatus according to the First Embodiment. As is shown in FIG. 4, the printing apparatus 101 is provided with a CPU 401, a ROM 402, a RAM 403, an HDD 404, a communications apparatus 405, an input apparatus 406, a display apparatus 407, a scanner apparatus 408, and a printing apparatus 409, which are shown in FIG. 4.

The CPU 401 integrally controls the entirety of the printing apparatus 101, and executes each function such as printing, scanning, and the like. The ROM 402 stores, for example, the basic control program for the printing apparatus 101. The RAM 403 is used as, for example, the working memory of the CPU 401.

The HDD 404 stores, for example, permanent data, or data that is temporarily generated during the execution of programs. The communications apparatus 405 connects the printing apparatus 101 to a LAN, the internet, or the like, and executes communications with other apparatuses.

The input apparatus 406 is, for example, a keyboard, a mouse, a hard key, or a touch panel, and receives operations that input characters, data, or the like. The display apparatus 407 is, for example, a liquid crystal display or a touch panel, and displays each type of screen such as the user interface, and the like.

This user interface is used, for example, in order to input commands to the printing apparatus 101 to cause the execution of jobs that print contents. The scanner apparatus 408 reads written documents or the like that have been inserted into the printing apparatus 101, and generates electronic data showing the contents that have been read. The printing apparatus 409 prints written documents and the like that have been input into the printing apparatus 101.

<Software Configuration of the Printing Apparatus>

Figure 5:
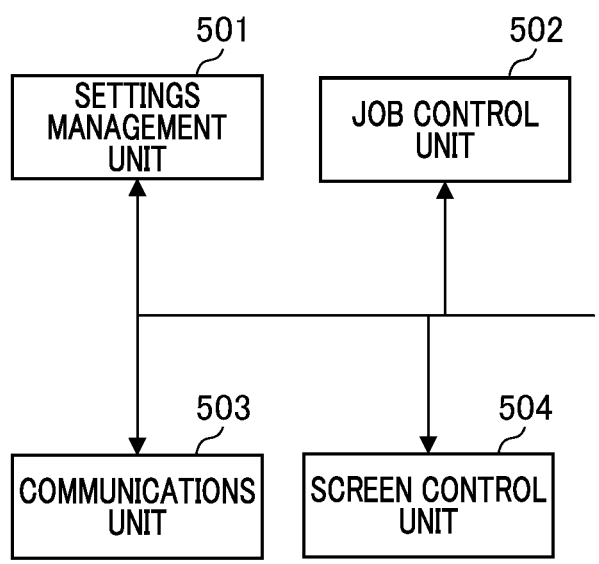
FIG. 5 is a diagram showing an example of a software configuration for a printing apparatus according to the First Embodiment.

FIG. 5 is a diagram showing an example of a software configuration of the printing apparatus according to the First Embodiment.

The printing apparatus 101 is provided with a settings management unit 501, a job control unit 502, a communications unit 503, and a screen control unit 504, which are shown in FIG. 5. In addition, these are saved onto the ROM 402 that was explained above as programs, and are decompressed on the RAM 403 when being executed by the CPU 401.

The settings management unit 501 stores settings related to the execution of each type of function that the printing apparatus 101 is provided with on each type of storage apparatus such as the RAM 403, the HDD 404, and the like, and reads these out from each storage apparatus. In addition, the settings that are referred to in this context are, for example, copy settings for executing the copy function, print settings for executing the print function, network settings, and individual identification information.

The job control unit 502 controls the scanner apparatus 408 or the printing apparatus 409 based on requests to execute jobs that print contents, and executes these jobs. In addition, the job control unit 502 also functions a print control unit that responds to operations to print contents, and prints contents by acquiring print data.

In a case in which print data has been output by the output unit to the print management system that manages print data, the print control unit acquires the print data from the print management system. In addition, the print control unit responds to user operations that make commands to the printing apparatus 101 to print contents, and prints the contents by acquiring the print data.

The communications unit 503 receives these jobs as well as requests to execute these jobs. In addition, the communications unit 503 communicates with the user device 104, the terminal 105, the user device 106, and the terminal 107, and transmits and receives information relating to these apparatuses. The screen control unit 504 displays screens on the display apparatus 407, and receives commands from the user via the input apparatus 406.

<Hardware Configuration for the Provision System>

Figure 6:
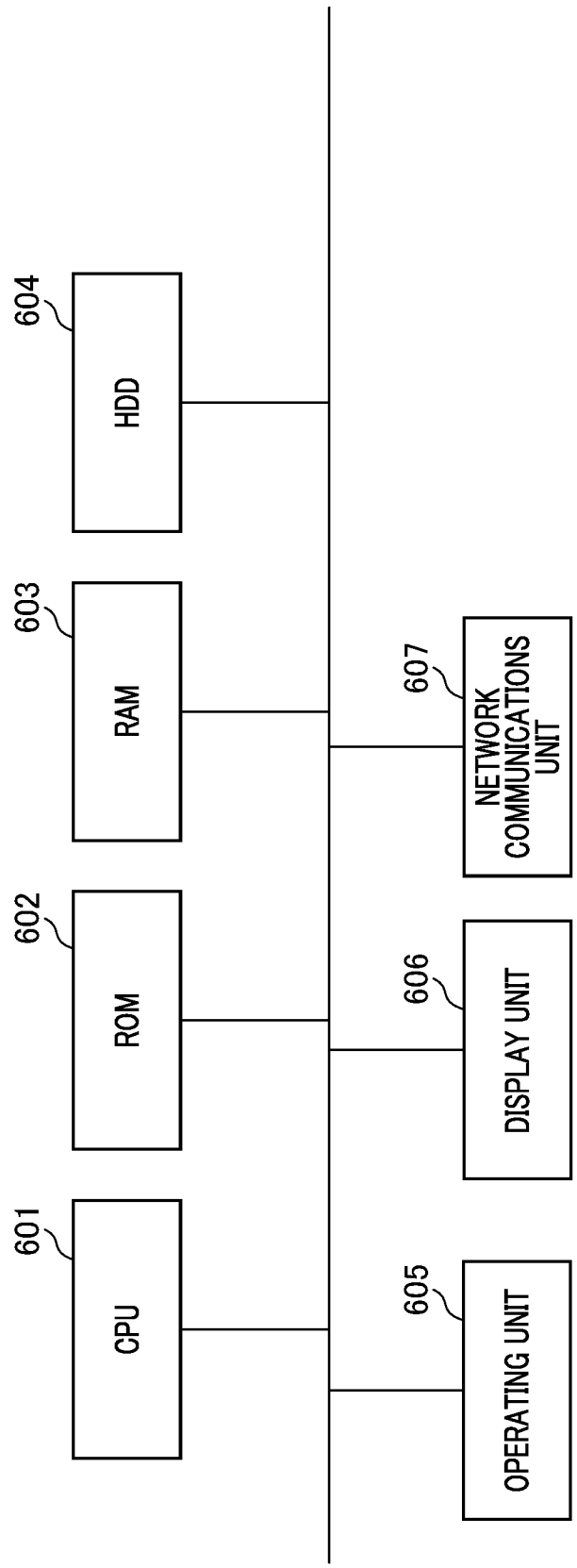
FIG. 6 is a diagram showing an example of a hardware configuration for a provision system according to the First Embodiment.

FIG. 6 is a diagram showing an example of a hardware configuration for the provision system according to the First Embodiment. The provision system 102 is provided with a CPU 601, a ROM 602, a RAM 603, an HDD 604, an operating unit 605, a display unit 606, and a network communications unit 607, which are shown in FIG. 6.

The CPU 601 controls each unit of the provision system 102. The ROM 602 stores a boot program that is necessary to start up the provision system 102. The RAM 603 is used as a work area that is used when the CPU 601 reads out and executes each type of program. The HDD 604 stores each type of information, programs that are executed by the CPU 601, and the like.

The operating unit 605 is, for example, a keyboard and a mouse, and is used to input characters, data, and the like by the user of the provision system 102. The display unit 606 is, for example, a liquid crystal display, and displays each type of information. The network communications unit 607 is connected to a network such as the internet or the like, and executes communications.

Note that the print management server 103 is assumed to have a hardware configuration that is the same as that of the provision system 102, and an explanation thereof will be omitted. However, the print management server 103 may also have a hardware configuration that is different from that of the provision system 102.

<Software Configuration of the Provision System>

Figure 7:
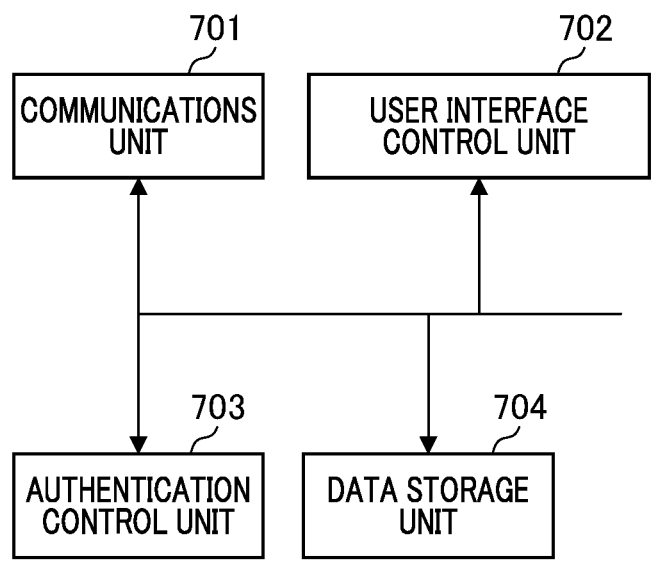
FIG. 7 is a diagram showing an example of a software configuration for a provision system according to the First Embodiment.

FIG. 7 is a diagram showing an example of a software configuration of the provision system according to the First Embodiment.

The provision system 102 is provided with a communications unit 701, a user interface control unit 702, an authentication control unit 703, and a data storage unit 704, which are shown in FIG. 7. In addition, these are saved on the above-described ROM 602 as programs, and are decompressed on the RAM 603 when being executed by the CPU 601.

The communications unit 701 executes communications with the user device 104, the terminal 105, the user device 106, the terminal 107, the printing apparatus 101, and the print management server 103, and executes the transmission and reception of each type of processing request. The user interface control unit 702 controls the user interface that is displayed on the user device 104, the terminal 105, the user device 106, and the terminal 107.

In a case in which, for example, information has been input into the user interface, a virtual object is created in the virtual space, and is transmitted to the user device 104, the terminal 105, the user device 106, or the terminal 107 via the communications unit 701.

In addition, the communications unit 701 also functions as a reception unit that receives operations to print contents corresponding to objects that exist in the virtual space in accordance with an operation that the user has executed within the virtual space.

The authentication control unit 703 executes processing to authenticate the user of the provision system 102. The user information that is used in this authentication is saved on the data storage unit 704 or a user management specific database. Conversely, the user information that is used in this authentication may also be acquired from outside of the provision system 102.

The date storage unit 704 stores data according to requests from the authentication control unit 703. In addition, the data storage unit 704 stores information necessary for the creation of virtual objects in the virtual space, and the like.

<Software Configuration of the Print Management Server>

Figure 8:
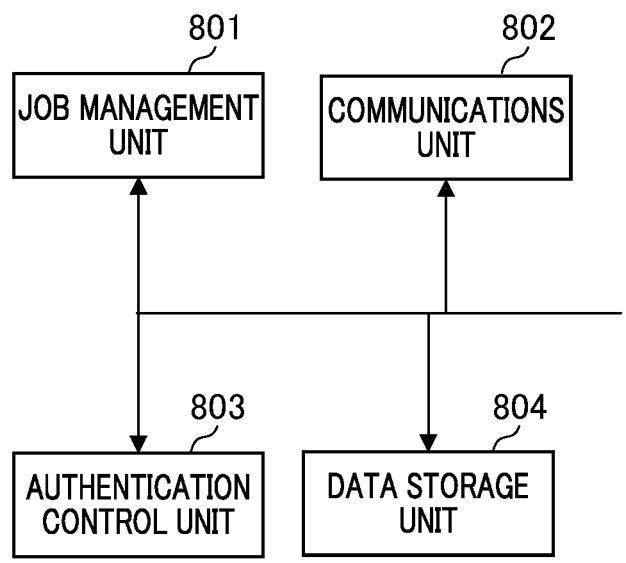
FIG. 8 is a diagram showing an example of a software configuration of a print management server according to the First Embodiment.

FIG. 8 is a diagram showing an example of a software configuration of the print management server according to the First Embodiment. The print management server 103 is provided with a job management unit 801, a communications unit 802, an authentication control unit 803, and a data storage unit 804, which are shown in FIG. 8.

These are stored as programs on a ROM that is installed on the print management server 103. In addition, these are decompressed on a RAM that is installed on the print management server 103 when being executed by a CPU that is installed on the print management server 103.

The job management unit 801 saves jobs that have been received from the provision system 102 on the data storage unit 804. The communications unit 802 executes communications with the printing apparatus 101, the provision system 102, the user device 104, the terminal 105, the user device 106, and the terminal 107, and executes the transmission and reception of each processing request.

The authentication control unit 803 executes processing that manages the user of the print management server 103. The user information that is used in this authentication is saved on the data storage unit 804 or a user management specific database.

Conversely, the user information that is used in this authentication may also be acquired from outside of the print management server 103. The data storage unit 804 stores data according to requests from the job management unit 801 or the authentication control unit 803.

<Initial Display Processing for the User Device>

Next, the initial display processing for the user device 104 and the user device 106 will be explained while referring to FIG. 9 through FIG. 11, and Table 1.

Figure 9:
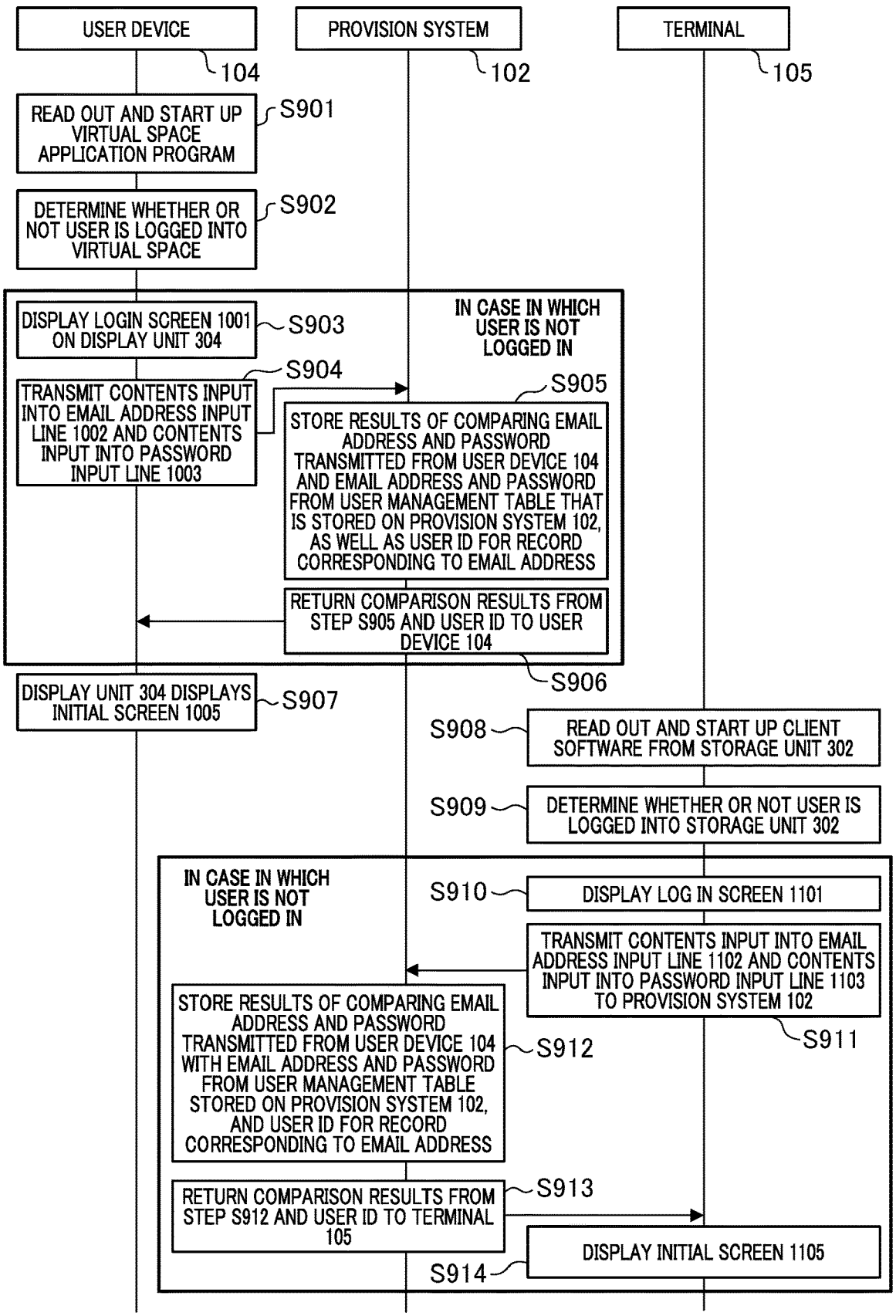
FIG. 9 is a sequence diagram showing an example of processing that is executed between the user device, the provision system, and the terminal or two from among these according to the First Embodiment.

FIG. 9 is a sequence diagram showing an example of processing that is executed between the user device, the provision system, or the terminal, or two from among these according to the First Embodiment. The processing that is shown in FIG. 9 is executed by each of the provision system 102, the user device 104, and the terminal 105 reading out and executing a program.

Conversely, the processing that is shown in FIG. 9 may also be executed by hardware such as an ASIC (Application Specific Integrated Circuit), an electronic circuit, or the like that is installed on each of the provision system 102, the user device 104, and the terminal 105. Table 1 shows an example of a user management table that is stored by the data storage unit 704 of the provision system 102.

TABLE 1

| User ID | Email Address | Password |
| --- | --- | --- |
| xxxx-0sds-46fbsd | abc@def.ne.jp | d8b076148c939d9d2dw2 |
| xxxx-1hfg-3xhsa5 | bsan@ghi.j.net | ye32dfsdfdse4rdfdsf4 |

The user management table includes user IDs, email addresses, and passwords. The provision system 102 automatically issues a user ID when an account registration is received based on an email address and a password that have been previously input.

In addition, the provision system 102 registers the email address and password along with this user ID on the user management table. In addition, the password, may, for example, be plaintext, or it may also be a value that has been generated by a one-way function or a decodable function.

Figure 10A:
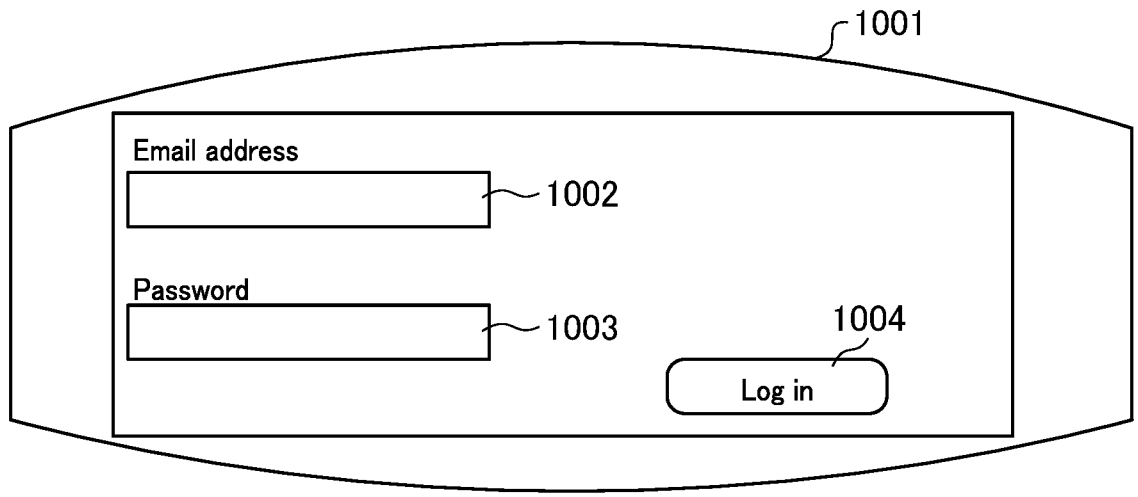
FIGS. 10A and 10B are diagrams showing examples of screens that are displayed on the display of the user device according to the First Embodiment.

FIG. 10 is a diagram showing an example of a screen that is displayed on a display of a user device according to the First Embodiment. FIG. 10A shows a login screen 1001. The login screen 1001 includes an email address input line 1002, a password input line 1003, and a login button 1004.

Figure 10B:
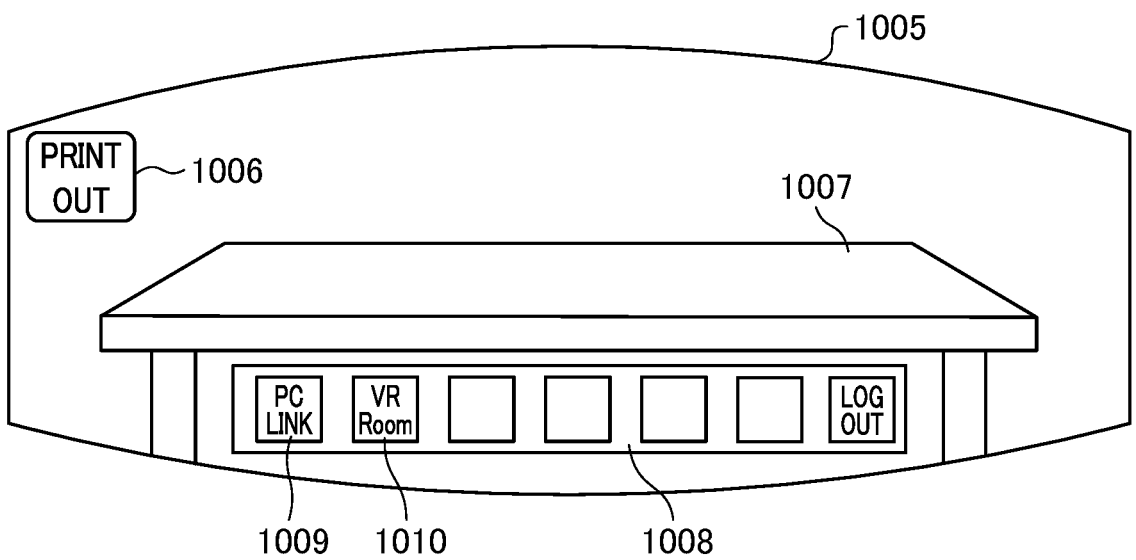

FIG. 10B shows an initial screen 1005. The initial screen 1005 includes a virtual print reception object 1006, a virtual desk object 1007, and a menu group 1008. The menu group 1008 includes a start up button 1009 for a screen connection function, and a virtual conference room entrance button 1010.

In addition, the icon image for the virtual print reception object 1006 may also be such that it is able to be changed by the user. In addition, the menu group 1008 may also include a button that is pressed when the user logs out from the virtual space.

Figure 11A:
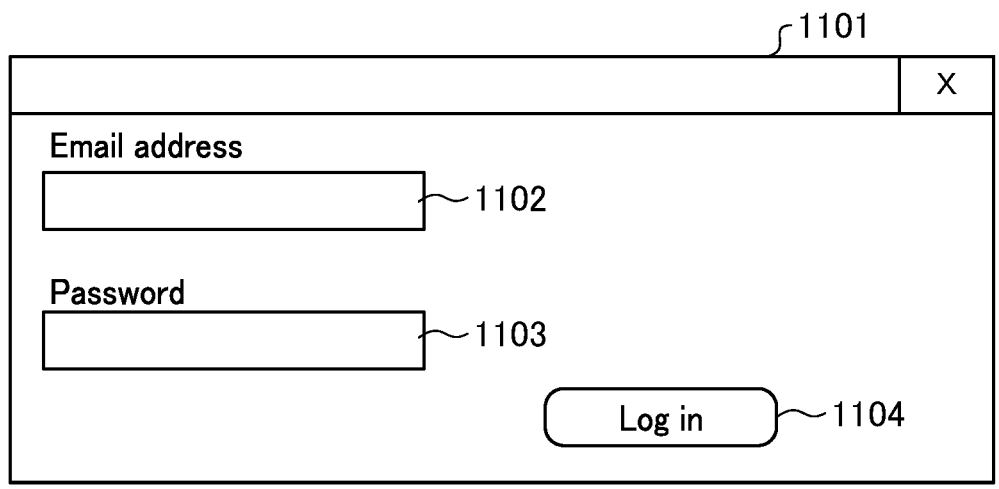
FIGS. 11A, and 11B are diagrams showing examples of screens that are displayed on the display of the terminal according to the First Embodiment.
Figure 11B:
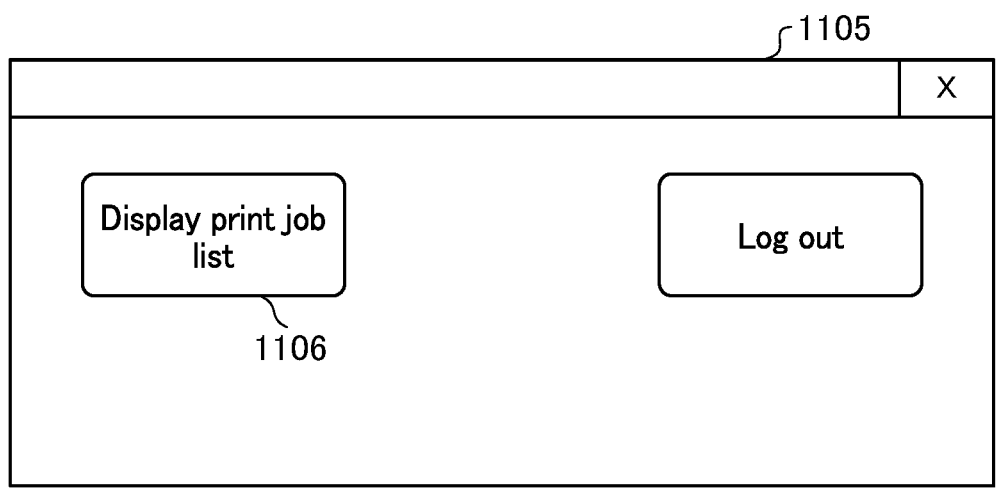

FIGS. 11A and 11B are diagrams showing an example of a screen that is displayed on the display of a terminal according to the First Embodiment. FIG. 11A shows a login screen 1101. The login screen 1101 includes an email address input line 1102, a password input line 1103, and a login button 1104.

FIG. 11B shows an initial screen 1105. The initial screen 1105 includes a print job list display button 1106. In addition, the initial screen 1105 may also include a button that is pressed when the user logs out from the virtual space.

During step S901, the application unit 306 reads out and starts up a virtual space application program from the storage unit 302 upon the operating unit 305 detecting that the application has been started up.

During step S902, the application unit 306 determines whether or not the user is logged into the virtual space. In a case in which the application unit 306 has determined that the user is logged into the virtual space, the processing proceeds to step S903. In contrast, in a case in which the application 306 has determined that the user is not logged into the virtual space, the processing proceeds to step S907.

During step S903, the application unit 306 displays the login screen 1001 on the display unit 304.

During step S904, in a case in which the application unit 306 has detected that the login button 1004 has been pressed via the operating unit 305, the next processing is executed. That is, during step S904, in this case, the application unit 306 transmits the contents that have been input into the email address input line 1002, and the contents that have been input into the password input line 1003 to the provision system 102 via the communications unit 301.

During step S905, the provision system 102 compares the email address and password that were received from the user device 104 with the email address and password from the user management table that is stored on the provision system 102 via the authentication control unit 703. Then, the provision system 102 stores the results of comparing whether or not both of these match, as well as the user ID for the record corresponding to the email address.

During step S906, the provision system 102 returns the results of the comparison from step S905 as well as the user ID to the user device 104 via the communications unit 701.

Durin step S907, the display unit 304 displays the initial screen 1005.

During step S908, upon the operating unit 305 detecting that an application has been started up, the application unit 306 reads out and starts up a client software from the storage unit 302.

During step S909, the application unit 306 determines whether or not the user is logged into to the storage unit 302. In a case in which the application unit 306 has determined that the user is not logged into the storage unit 302, the processing proceeds to step S910. In contrast, in a case in which the application unit 306 has determined that the user is logged into the storage unit 302, the processing proceeds to step S914.

During step S910, the display unit 304 displays the login screen 1101.

During step S911, in a case in which the application unit 306 has determined that the login button 1004 has been pressed via the operating unit 305, the next processing is executed. That is, during step S911, in this case, the application unit 306 transmits the contents that have been input into the email address input line 1102 and the contents that have been input into the password input line 1103 to the provision system 102 via the communications unit 301.

During step S912, the provision system 102 compares the email address and password that have been received from the user device 104 with the email address and password from the user management table that is stored on the provision system 102 via the authentication control unit 703.

Then, the provision system 102 stores the results of confirming whether or not these both match, as well as the user ID for the record corresponding to the email address.

During step S913, the provision system 102 returns the results of the comparison during step S912 and the user ID to the terminal 105 via the communications unit 701.

During step S914, the display unit 304 displays the initial screen 1105.

As was explained above with reference to FIG. 9 and the like, the user device 104 and the terminal 105 are both able to display an initial display screen.

<Screen Connection Processing for the User Devices>

Figure 12:
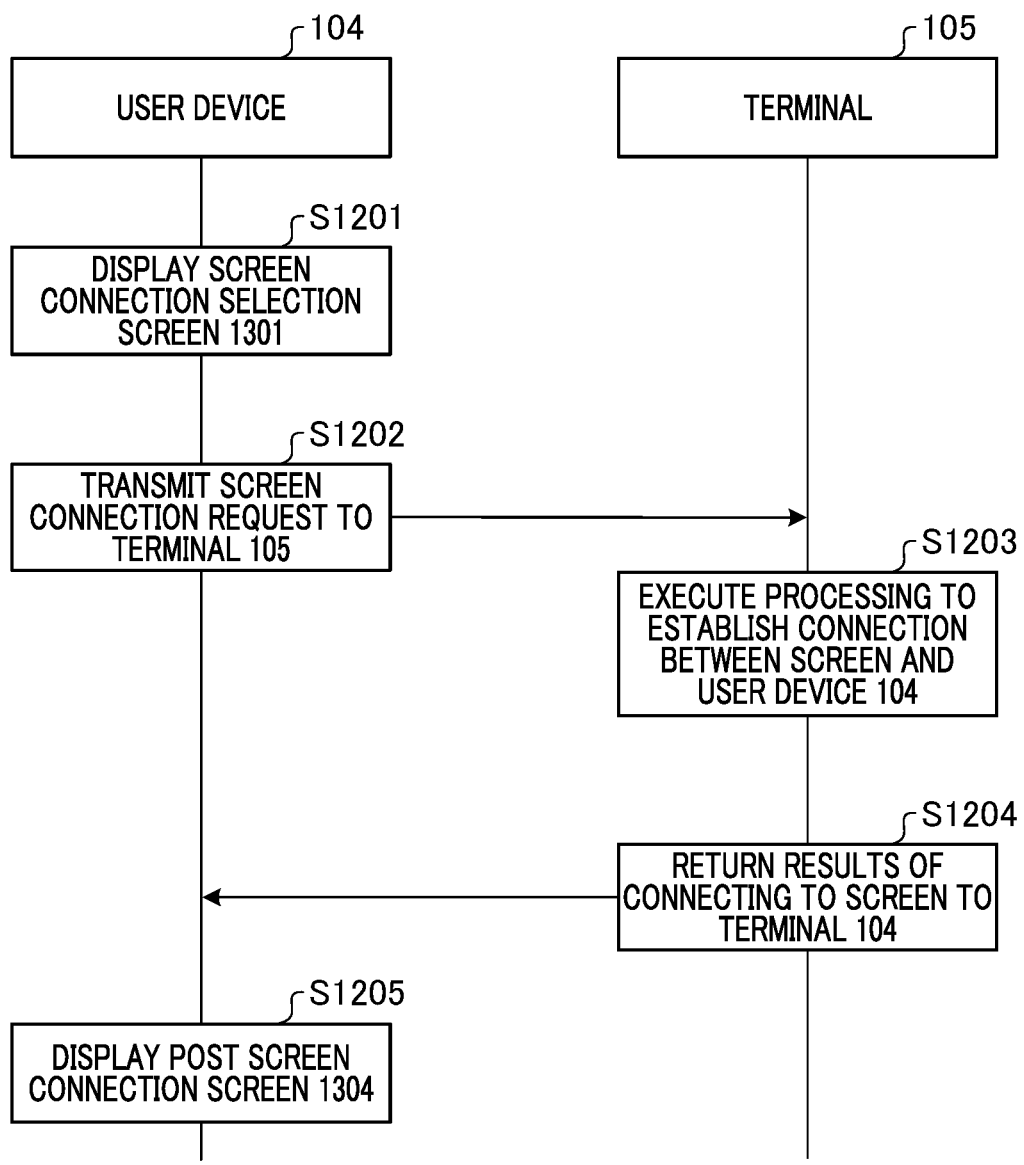
FIG. 12 is a sequence diagram showing an example of processing that is executed between the user device and the terminal according to the First Embodiment.

Next, the processing until the user device 104 displays the screen of the terminal 105 will be explained with reference to FIG. 12 and FIG. 13. FIG. 12 is a sequence diagram showing an example of processing that is executed between the user device and the terminal according to the First Embodiment.

Specifically, FIG. 12 shows an example of processing in which the user device 104 is connected to the terminal 105, and the screen for the terminal 105 is displayed. The processing that is shown in FIG. 12 is executed by, for example, both the CPU 201 of the user device 104 and the CPU 201 of the terminal 105 reading out and executing a program. Conversely, the processing that is shown in FIG. 12 may also be realized by hardware such as an ASIC, an electronic circuit, or the like that is installed in each of the user device 104 and the terminal 105.

Figure 13A:
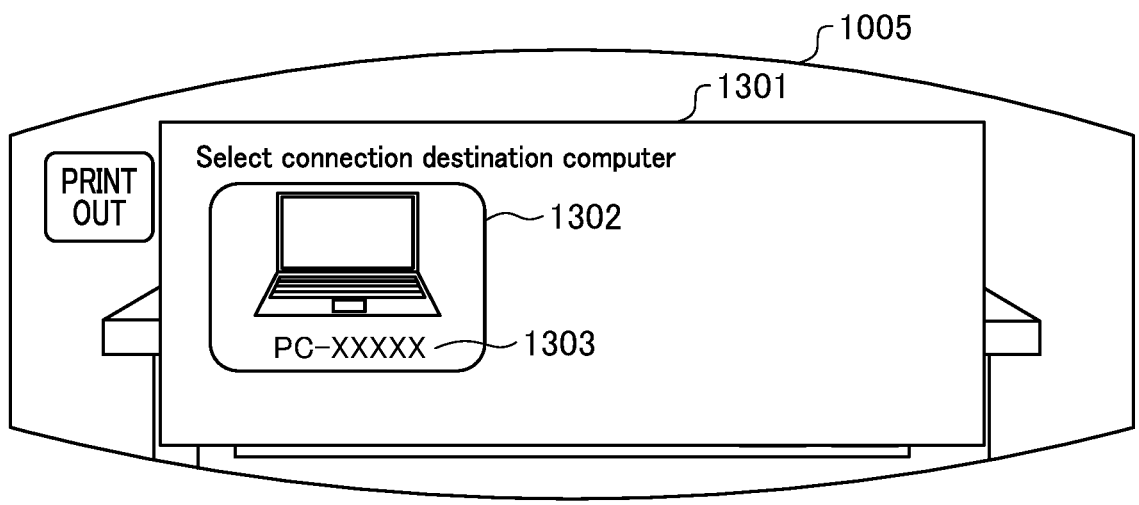
FIGS. 13A and 13B are diagrams showing examples of screens that are displayed on the display of user device according to the First Embodiment.
Figure 13B:
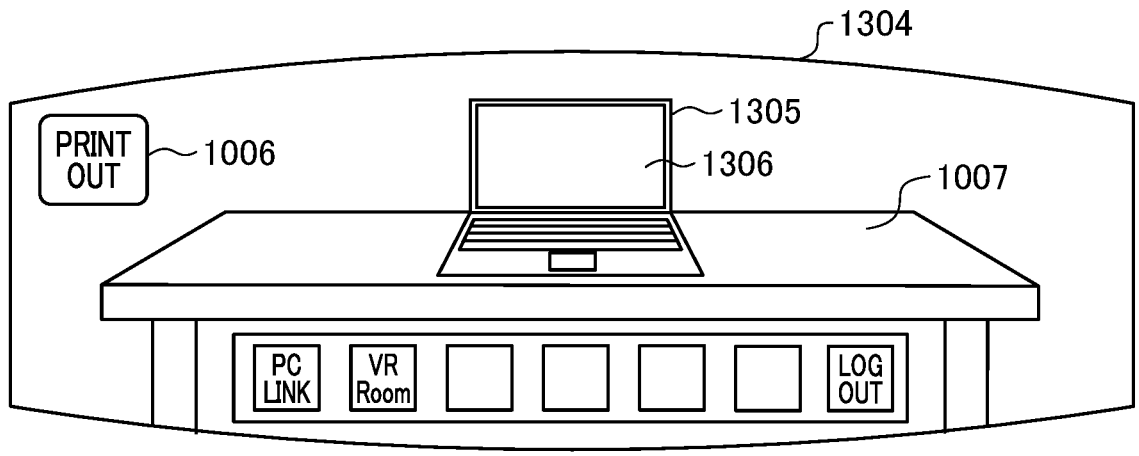

FIGS. 13A and 13B are diagrams showing an example of screen that is displayed on the display of a user device according to the First Embodiment. FIG. 13A shows the state in which a screen connection destination selection screen 1301 is displayed as a dialogue on the initial screen 1005. The screen connection destination selection screen 1301 may also be displayed by transitioning screens from the initial screen 1005.

The screen connection destination selection screen 1301 includes a screen connection destination button 1302. The screen connection destination button 1302 includes a device name 1303. The user device 104 and the terminal 105 execute pairing in advance via each of their short range radio communications control units 307.

In addition, at this time, the user device 104 stores the device name for the terminal 105 via the storage unit 302. This device name is displayed on the screen connection destination selection screen 1301.

FIG. 13B shows a post screen connection screen 1304. The post screen connection screen 1304 includes a virtual terminal object 1305 in addition to the configurational elements from the initial screen 1005. The virtual terminal object 1305 includes a virtual screen 1306, and is positioned on top of a virtual desk object 1007. The virtual screen 1306 renders contents that are displayed on the display 208 of the terminal 105, which is the screen connection destination.

During step S1201, upon detecting a pressing operation for the start up button 1009 for the screen connection function by the operating unit 305, the application unit 306 displays the screen connection destination selection screen 1301 via the display unit 304.

During step S1202, upon detecting that the screen connection destination button 1302 has been pressed by the user using the operating unit 305, the application unit 306 transmits a screen connection request to the terminal 105 via the communications unit 301.

During step S1203, upon the screen connection request being received from the user device 104, the application unit 306 executes processing to establish the connection between the user device 104 and the screen.

During step S1204, the application unit 306 returns the results of connecting the user device 104 to the screen via the communications unit 301.

During step S1205, the application unit 306 displays the post screen connection screen 1304 via the display unit 304.

As has been explained above with reference to FIG. 12, and FIG. 13, it is possible to display the screen of the terminal 105 on the user device 104.

<Processing to Create a Job to Print Contents>

Next, an explanation will be given with reference to FIG. 14 through FIG. 17, and Table 2 with respect to the processing for creating a job that prints contents from the user device 104. Table 2 shows an example of a print job management table that is stored on the data storage unit 704 of the print management server 103.

| User ID | File Name | Job creation date and time | Status | Job Execution date and time |
| --- | --- | --- | --- | --- |
| xxxx-0sds-46fbsd | Presentation.pptx | 2022 May 13 13:43:52 | Not yet executed | |
| xxxx-0sds-46fbsd | shot20220513_143321.jpg | 2022 May 13 14:33:21 | Not yet executed | |
| xxxx-0sds-46fbsd | Agenda.docx | 2022 May 20 07:16:37 | Not yet executed | |
| xxxx-0sds-46fbsd | gijiroku_20220530.txt | 2022 May 30 18:20:05 | Not yet executed | |
| xxxx-0sds-46fbsd | shot20220606_115002.jpg | 2022 Jun. 6 11:50:02 | Not yet executed | |

The print job management table includes user IDs, file names, job creation dates and times, statuses, and job execution dates and times. The print management server 103 creates a record in the print job management table upon the reception of a job to print contents.

Figure 16:
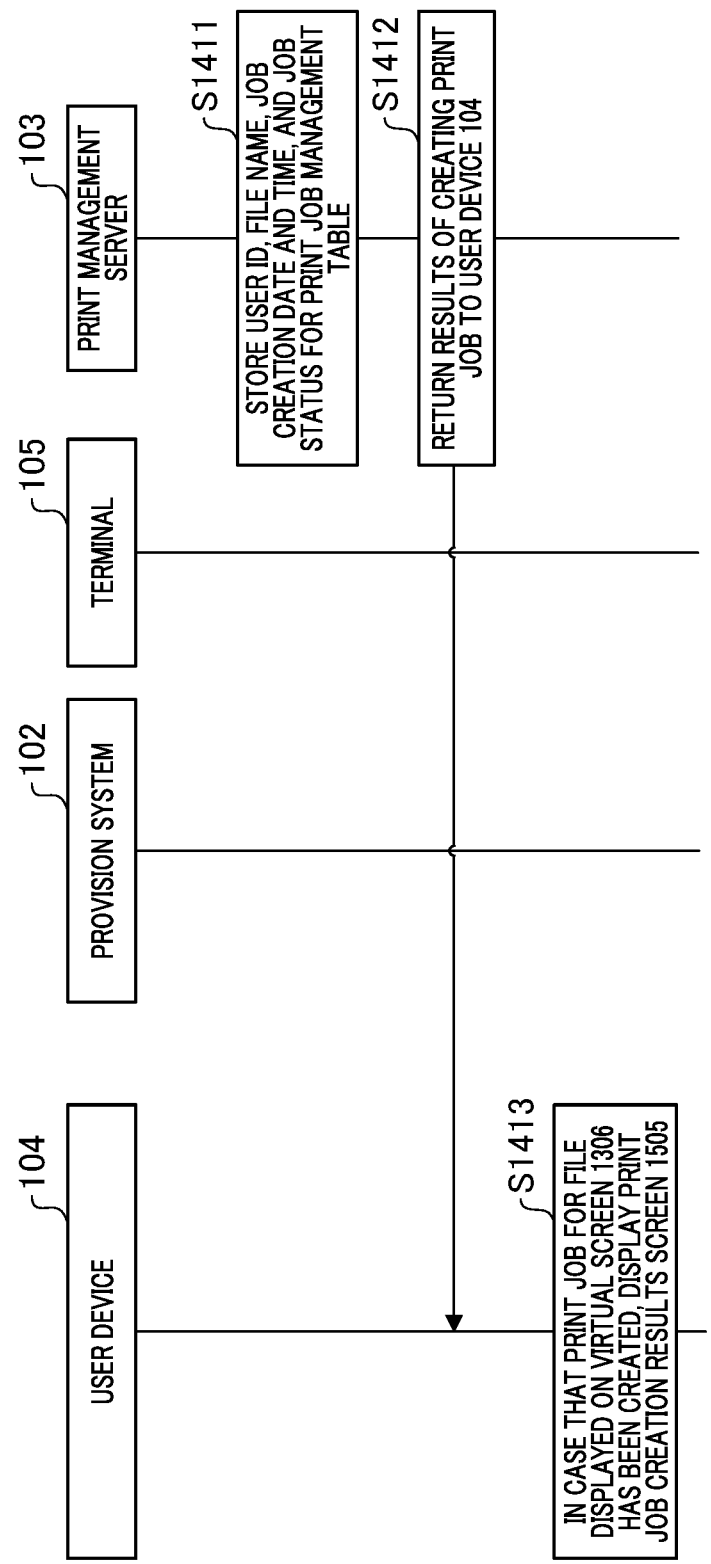
FIG. 16 is a diagram showing an example of processing that is executed between the user device, the provision system, the terminal, and the print management server, or two from among these according to the First Embodiment.

FIG. 14 through FIG. 16 are diagrams showing examples of processing that is executed between the user device, provision system, terminal, and print management server, or two from among these according to the present embodiment. FIG. 14 through FIG. 16 show an example of processing in which a print job for the contents that have been displayed on the virtual screen 1306 of the user device 104 is created on the print management server 103.

The processing that is shown in FIG. 14 through FIG. 16 is executed by, for example, each of the CPUs of the print management server 103, the CPU 201 of the user device 104, and the CPU 201 of the terminal 105 reading out and executing a program.

Figure 17A:
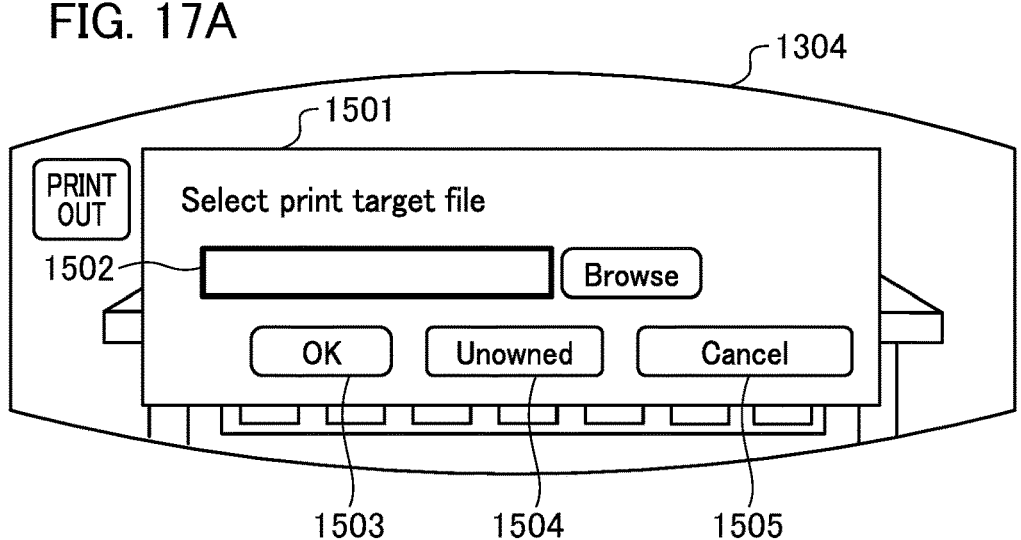
FIGS. 17A to 17C are diagrams showing examples of screens that are displayed on the display of the user device according to the First Embodiment.
Figure 17B:
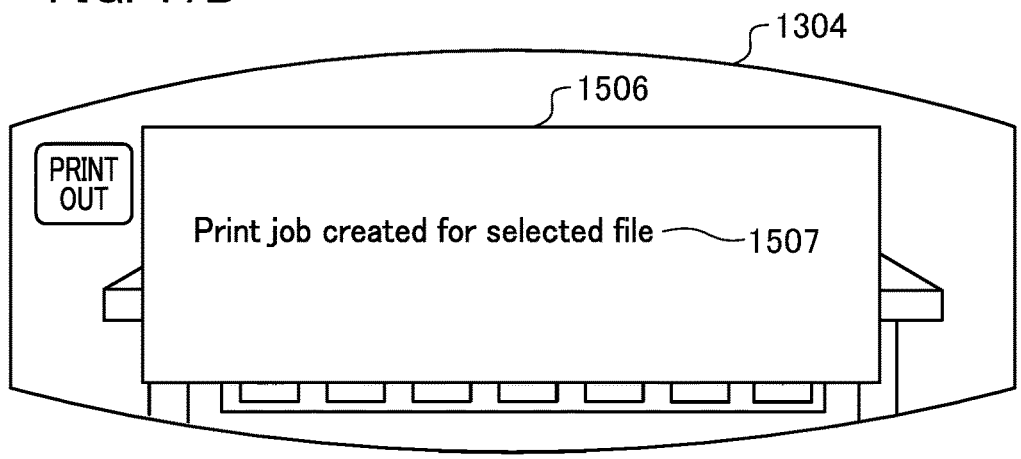
Figure 17C:
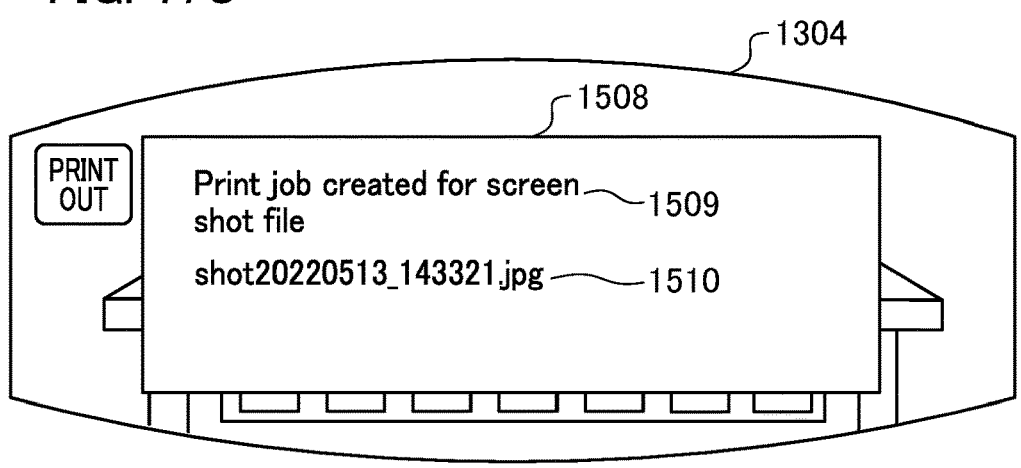

Conversely, the processing that is shown in FIG. 14 through FIG. 16 may also be realized by hardware such as an ASIC, an electronic circuit, or the like that is installed in each of the print management sever 103, the user device 104, and the terminal 105, FIGS. 17A to 17C are diagrams showing an example of a screen that is shown on the display of the user device according to the First Embodiment. FIGS. 17A to 17C show examples of states in which a screen is transitioning from the display of a print target file pass input screen 1501, which was displayed on the display 208 of the user device 104, to a print job creation results screen.

FIG. 17A shows a state in which the print target file pass input screen 1501 is displayed as a dialogue on the post screen connection screen 1304. The print target file pass input screen 1501 may also be displayed by transitioning the screen from the post screen connection screen 1304.

The print target file pass input screen 1501 includes a file pass input line 1502, an OK button 1503, and an unowned button 1504. In addition, in a case in which the file pass input line 1502 has not been input, the OK button 1503 enters an inactive state in which it cannot be pressed.

In contrast, in a case in which the file pass input line 1502 has been input, the OK button 1503 enters an active state in which it can be pressed. The unowned button 1504 can be pressed regardless of whether or not the file pass input line 1502 has been input.

FIG. 17B shows a state in which, in a case in which a print job has been created for a file that was displayed on the virtual screen 1306, the print job creation results screen 1505 has been displayed as a dialogue on the post screen connection screen 1304. The print job creation results screen 1505 includes a print job creation results message 1506. The print job creation results screen 1505 may also by displayed by transitioning the screen from the post screen connection screen 1304.

FIG. 17C shows a state in which, in a case in which a print job has been created for a screenshot file that includes the virtual screen 1306, the print job creation results screen 1507 has been displayed as a dialogue on the post screen connection screen 1304. The print job creation results screen 1507 includes a print job creation results message 1508 and a screenshot file name 1509. The print job creation results screen 1507 may also be displayed by transitioning the screen from the post screen connection screen 1304.

During step S1401, the application unit 306 detects an operation to send a file from the virtual screen 1306 to the virtual print reception object 1006 via the operating unit 305.

During step S1402, the application unit 306 displays a print target file pass input screen 1501 via the display unit 304.

During step S1403, the application unit 306 executes processing to set a print target file by using contents that have been input on the print target file pass input screen 1501.

Figure 18:
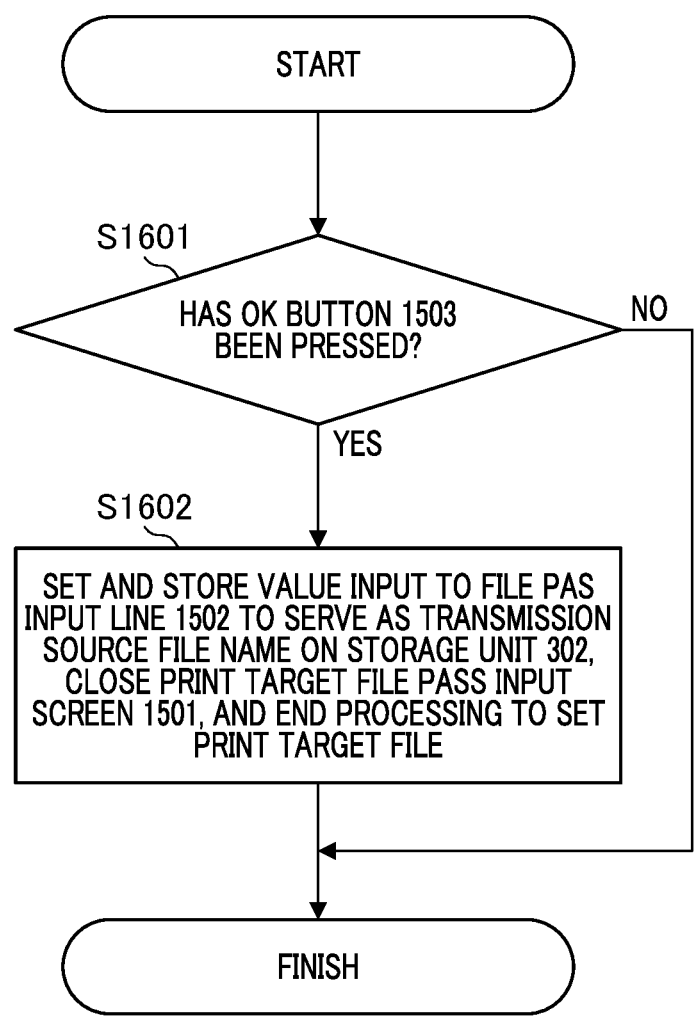
FIG. 18 is a diagram showing an example of processing for determining the contents to be printed by the user device according to the First Embodiment.

In this context, the details for the processing for step S1403 will be explained with reference to FIG. 18. FIG. 18 is a diagram showing an example of processing in which the user device according to the First Embodiment determines the contents to be printed. The processing that is shown in FIG. 18 is realized by the CPU 201 of the user device 104 reading out and executing a program.

During step S601, the application unit 306 determines whether or not the OK button 1503 has been pressed. In a case in which the application unit 306 has determined that the OK button 1503 has been pressed (step S1601: YES), the processing proceeds to step S1602. In contrast, in a case in which the application unit 306 has determined that the OK button 1503 has not been pressed (step S1602: NO), the processing is completed, During step S1602, the application unit 306 stores a value that has been input into the file pass input line 1502 as the settings for a transmission source file name in the storage unit 302, closes the print target file pass input screen 1501, and completes the processing to set the print target file.

Explained above is the processing in which the application unit 306 of the user device 104 sets the print target file. Below, the explanation will return to FIG. 14 through FIG. 16.

During step S1404, the application unit 306 determines whether or not the transmission source file name has been set in the storage unit 302. In a case in which the application unit 306 has determined that the transmission source file name has been set in the storage unit 302, the processing proceeds to step S1405. In contrast, in a case in which the application unit 306 has determined that the transmission source file name has not been set in the storage unit 302, the processing proceeds to step S1407.

During step S1405, the application unit 306 transmits a command to the terminal 105 via the communications unit 301 to print a file corresponding to the transmission source print name that was obtained during step S1404.

During step S1406, the application unit 306 transmits the user ID, and the file that corresponds to the transmission source file name that was received from the user device 104 to the print management server 103 via the communications unit 301.

During step S1407, the application unit 306 transmits a request to create a screenshot corresponding to the user ID to the provision system 102 via the communications unit 301.

During step S1408, the provision system 102 creates a screenshot file corresponding to the user ID with a file name that has been automatically generated. The file name for the screenshot file may be a fixed character string, or a character string including the date and time, or it may also be a random character string that has been obtained by using a one-way function.

In addition, the storage destination for the screenshot file may also be the provision system 102, or it may also be an external storage. Furthermore, the storage destination for the screenshot file is stored along with a URL for the storage destination.

During step S1409, the provision system 102 returns the screenshot file that was created during step S1408 to the user device 104 via the communications unit 701. In addition, during step S1408, the URL that shows the provision system or the external storage on which the screenshot file that the provision system 102 has created was saved may also be transmitted.

During step S1410, the application unit 306 transmits the user ID, as well as the screenshot file or the URL for the screenshot file that was received from the provision system 102 to the print management server 103 via the communications unit 301.

During step S1411, the print management server 103 stores the user ID, the file name, the job creation date and time, and the job status for the print job management table. This user ID is set as the file name that was received during step S1406 or step S1410.

This file name is set as the file name that was received during step S1406 or step S1410. This job creation date and time is the date and time in the print system from the point in time at which step S1412 was executed.

This job status becomes "not yet executed", and the job execution date and time becomes an empty line. During step S1406 or step S1410, the print management server 103 saves a file if a file has been received, and if this is the URL for a screenshot file, saves the screenshot file by accessing the URL. This processing is executed via the data storage unit 804.

During step S1412, the print management sever 103 returns the results of creating the print job to the user device 104 via the communications unit 802.

During step S1413, in a case in which a print job has been created for a file that was displayed on the virtual screen 1306, the application unit 306 displays the print job creation results screen 1505 via the display unit 304.

As has been explained above, the user device 104 is able to create a print job on the print management server 103. Note that in the processing that is shown in FIG. 14 through FIG. 16, the print target file may be any kind of file, such as a PDF file or the like, as long as it is a document file that can be converted into spool data on the print management server 103, and can be specified by the user device 104.

<Print Processing>

Next, the processing for executing print jobs from the terminal 105 will be explained with reference to FIG. 19 through FIG. 21 and Table 3.

Figure 19:
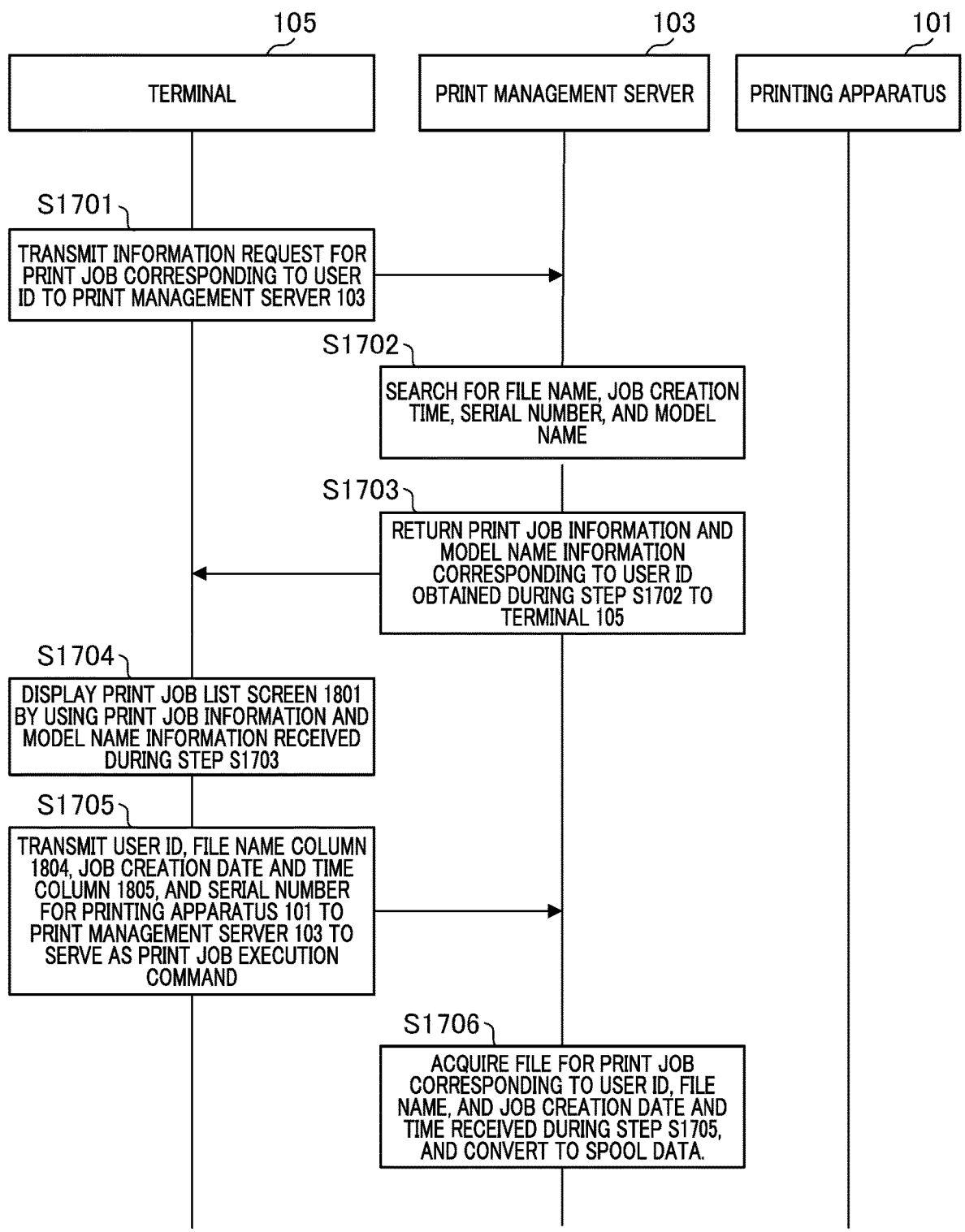
FIG. 19 is a diagram showing an example of processing that is executed between the terminal, the print management server, and the printing apparatus, or two from among these when contents are being printed according to the First Embodiment.
Figure 20:
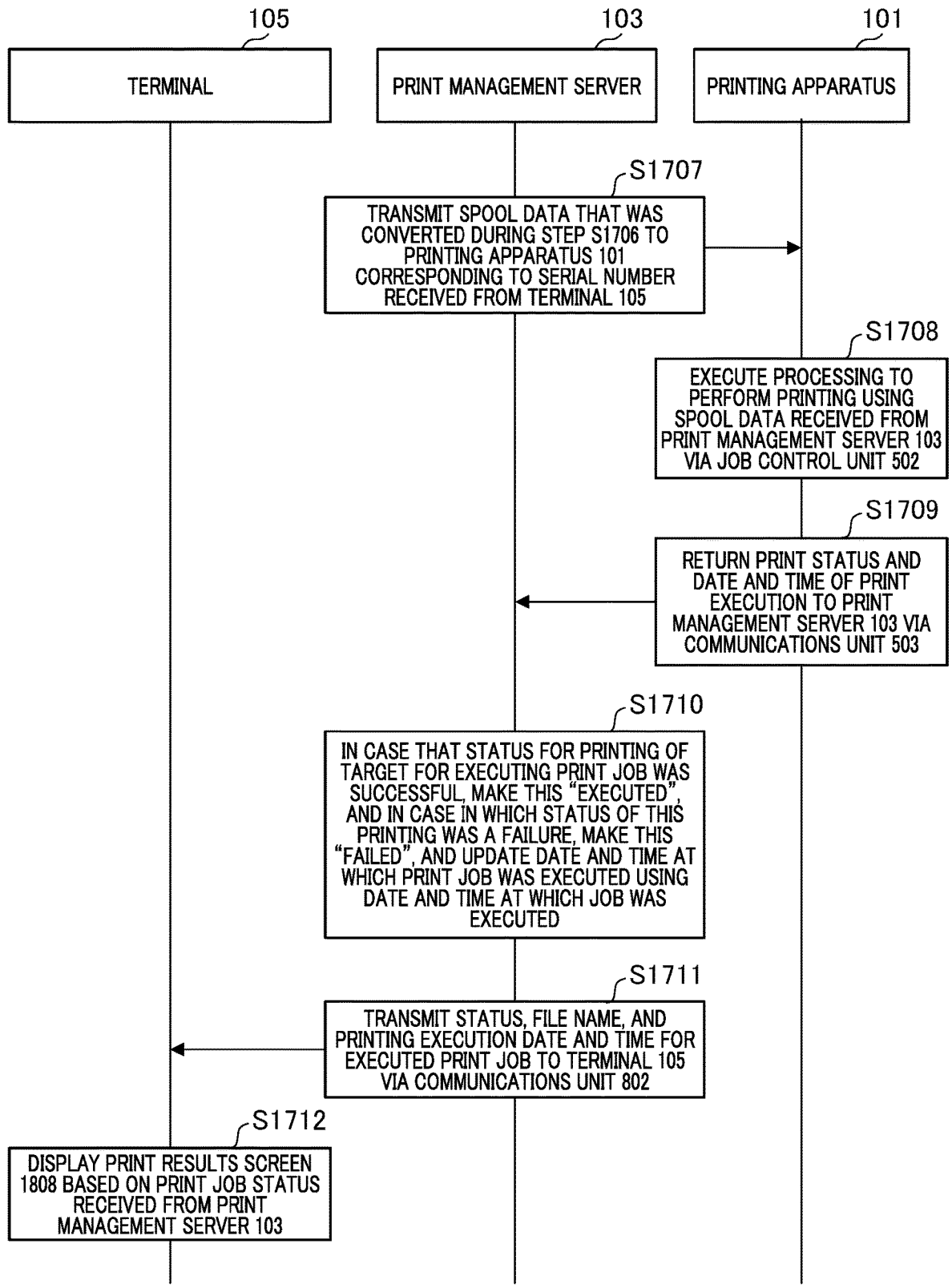
FIG. 20 is a diagram showing an example of processing that is executed between the terminal, the print management server, and the printing apparatus, or two from among these when contents are being printed according to the First Embodiment.

FIG. 19, and FIG. 20 are diagrams showing examples of processing that is executed between the terminal, the print management server, the printing apparatus, or two from among these when contents are printed according to the First Embodiment. Specifically, FIG. 19 and FIG. 20 are sequence diagrams showing one example of processing for executing a print job from the terminal 105.

The processing that is shown in FIG. 19 and FIG. 20 is executed by each of the printing apparatus 101, the print management server 103, and the terminal 105 reading out and executing a program. Conversely, the processing that is shown in FIG. 19 and FIG. 20 may also be realized by hardware such as an ASIC, an electronic circuit, or the like. Table 3 shows an example of a printer management table that is stored in the data storage unit 704 of the print management server 103.

| User ID | Serial Number | Device Model Number | Device Name |
|---|---|---|---|
| xxxx-0sds-46fbsd | AAAA11111 | TRSXXXX | MyPrinter |
| xxxx-1hfg-3xhsa5 | BBBB22222 | TRAYYYY | PRT001 |

The printer management table includes user IDs, serial numbers, device model numbers, and device names. The print management server 103 receives the registration of a serial number, a device model number, and a device name for the printing apparatus 101, which a user has input in advance, registers these in the printer management table, and stores them.

Figure 21A:
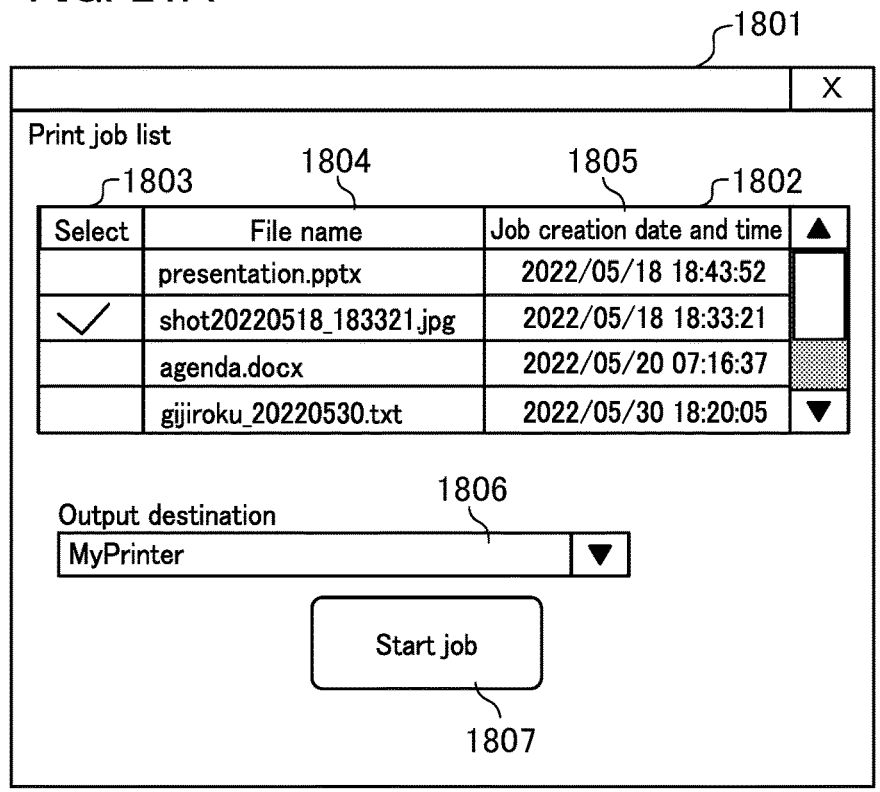
FIG. 21A and FIG. 21B are diagrams showing an example of a screen that is displayed on the display of the terminal when contents are being printed according to the First Embodiment.
Figure 21B:
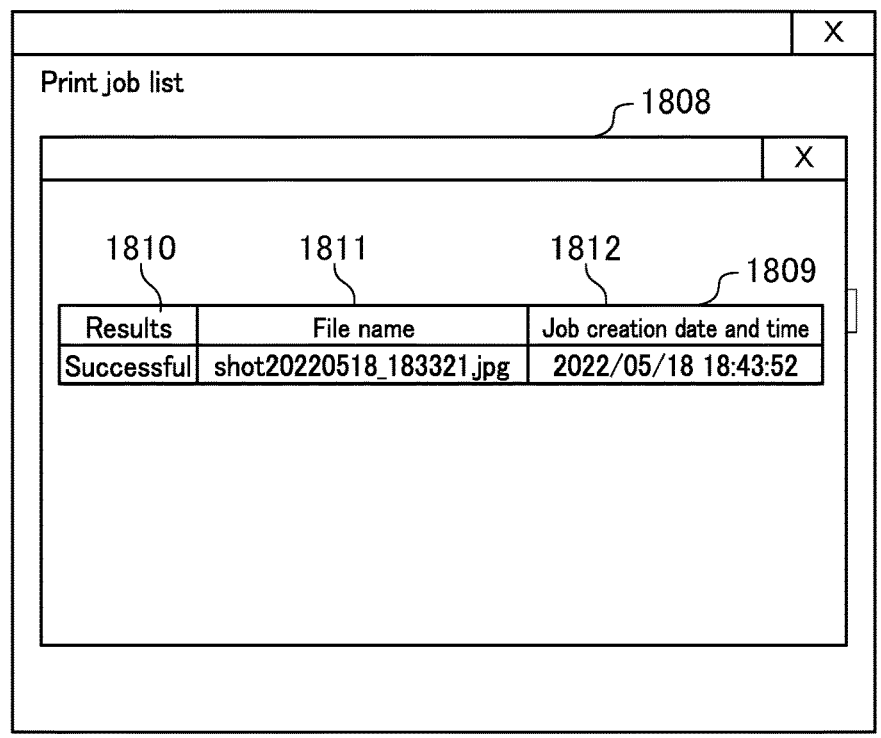
Figure 25:
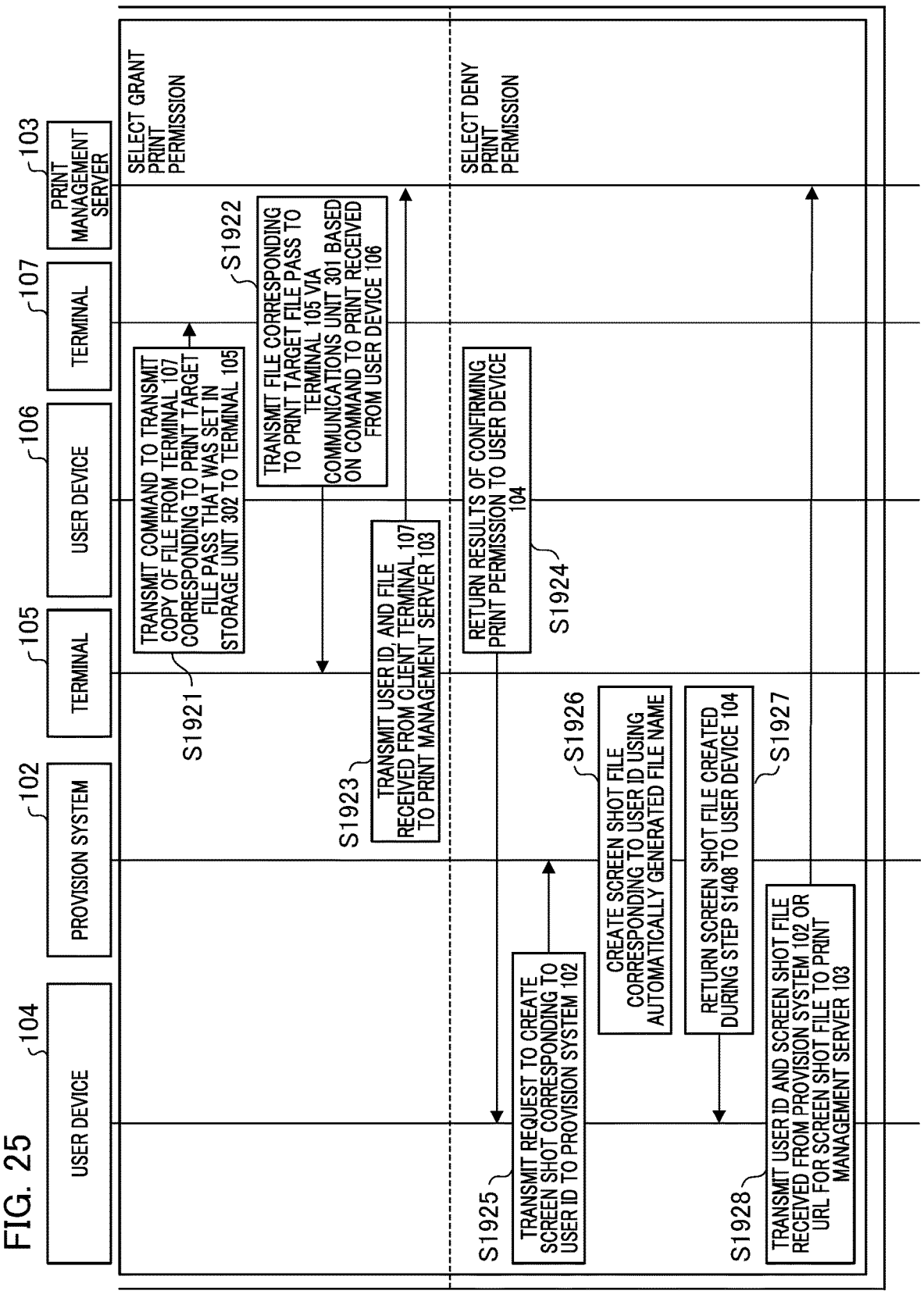
FIG. 25 is a sequence diagram showing an example of processing that is executed by the printing system according to the Second Embodiment.

FIG. 21A and FIG. 21B are diagrams showing an example of a screen that is displayed on the display of a terminal when contents are being printed according to the First Embodiment. Specifically, FIG. 21A and FIG. 21B show screen transitions from a print processing job list screen that has been displayed on the display 208 of the terminal 105 to a print results screen.

FIG. 21A shows a print job list screen 1801. The print job list screen 1801 includes a print job list 1802, an output destination list 1806, and a job start button 1807. The print job list 1802 includes a selection column 1803, a file name column 1804, and a job creation date and time column 1805.

In a case in which the number of items for the print job list that is being displayed exceeds the number of items that the print job list 1802 is able to display, the print job list 1802 may also be displayed along with a scroll bar. In a case in which one or more of the rows for the print job list 1802 have been pressed, a check mark is displayed in the selection row 1803 for each corresponding row, and these become a state in which the print job for this row has been selected.

The display value for the output destination list 1806 is configured by a character string that is derived from the device name for the record for the print management table that is linked with the user. In addition, instead of being the device name, the display value for the output destination list 1806 may also by the serial number or product model number from the same table, or it may also be a combination of these.

The selection value for the output destination list 1806 is the serial number for the printer management table linked with the user. The print job list screen 1801 may also include a delete button with the function of deleting a print job corresponding to a case in which this has been pressed when the print job list 1802 is in a selected state, and a return button that transitions the display to the initial screen 1105 when pressed.

FIG. 21B shows a state in which the print results screen 1808 has been displayed as a dialogue on the print job list screen 1801. The print results screen 1808 may also be displayed by transitioning the screen from the print job list screen 1801.

The print results screen 1808 includes a print results list 1809. The print results list 1809 includes a print results column 1810, a file name column 1811, and a job execution date and time column 1812. In addition, in a case in which the number of cases of print jobs to be executed exceeds the number of cases that can be displayed, the print results list 1809 may also be displayed along with a scroll bar.

During step S1701, in a case in which it has been detected that the print job list display button 1106 of the initial screen 1105 has been pressed via the operating unit 305, the application unit 306 executes the following processing. In such a case, the application unit 306 transmits a print job information request corresponding to the user ID to the print management server 103 via the communications unit 301.

During step S1702, the print management server 103 searches for the file name and job creation date and time for records other than for those for which the job status is "executed" from among the records for the print job management table that was shown in FIG. 2. In addition, during step S1702, the print management server 103 searches for the serial number and model name from the printer management table corresponding to the user ID.

During step S1703, the print management server 103 returns the print job information and model name information corresponding to the user ID that was obtained during step S1702 to the terminal 105 via the communications unit 802.

During step S1704, the application unit 306 displays the print job list screen 1801 on the display unit 304 by using the print job information and the model name information that were received during step S1703.

During step S1705, the application unit 306 executes the following processing in a case in which it has been detected that the job start button 1807 has been pressed via the operating unit 305. In such a case, the application unit 306 transmits the user ID, the file name column 1804, the job creation date and time column 1805, and the serial number for the printing apparatus 101 to the print management server 103 to serve as a print job execution command.

The file name column 1804 is a row that is in a state in which it has been selected in the print job list 1802. The serial number for the printing apparatus 101 is a serial number that has been selected in the output destination list 1806. In addition, communication may be performed with the print management server 103 via the communications unit 301, and a screen on which printing settings such as the number of print copies, the print target pages, the image quality and the like that are assigned to the printing apparatus 101 that was selected from the output destination list 1806 are set may also be displayed.

During step 1706, the print management server 103 acquires the user ID, the file name, and the job creation date and time corresponding to the print job file that were received during step S1705 and converts these to spool data via the authentication control unit.

In addition, this print job is acquired via the data storage unit 804 or the communications unit 802. The spool data is converted according to the device type model number for the record that is obtained by comparing the serial number for the print management table and the serial number that has been received from the terminal 105.

During step S1707, the print management server 103 transmits the spool data that was converted during step S1706 to the printing apparatus 101 that corresponds to the serial number that was received from the terminal 105 via the communications unit 802.

During step 1708, the printing apparatus 101 executes printing processing with the spool data that was received from the print management server 103 via the job control unit 502.

During step S1709, the printing apparatus 101 returns the print status and the date and time at which the printing was executed to the print management server 103 via the communications unit 503.

During step S1710, in a case in which, from among the print job management table that was shown in Table 2, the print status for the target of the print job is successful, the print management server 103 makes this "executed", and in a case in which the status for this print was a failure, makes this "failed". In addition, during step S1710, the print management server 103 updates the date and time at which the job was executed to the date and time at which the print job was executed.

During step S1711, the print management server 103 transmits the status for the executed print job, the file name, and the date and time of the print execution, to the terminal 105 via the communications unit 802.

During step S1712, the application unit 306 displays the print results screen 1808 based on the status for the print job that was received from the print management server 103.

As has been explained above, according to the First Embodiment, it is possible for the user device 104 to print screenshot files or print target files by an operation that creates a print job using the user device 104 according to the presence or absence of a file in the terminal 105.

Note that the print management server 103 according to the First Embodiment handles the function of saving print target files, and the function of storing and controlling jobs. In addition, the print management server 103 may also be a configuration in which a print target file is saved on an online storage server that is provided by a service on the internet, and print jobs are executed by the print management server 103 communicating with the online storage server.

Second Embodiment

In the First Embodiment, an example was explained in which in a case in which a single user has displayed a screen of the terminal 105 from the user device 104, printing is performed by switching the processing according to whether or not a file pass was indicated.

In this context, in the Second Embodiment, an example will be explained in which, in a case in which a plurality of users is accessing a virtual conference room that is provided in a virtual space, and they have permission from a person projecting a file, the file that is being projected by this person is printed.

Note that in the Second Embodiment, it is assumed that the user device 104 and the terminal 105 are being used by a user who is accessing the virtual conference room, and the user device 106 and the terminal 107 are being used by the person projecting the file.

In addition, in the explanation of the Second Embodiment, the explanation will focus on contents that differ from those of the First Embodiment, and explanations of contents that are the same as those in the First Embodiment will be suitably omitted.

<Initial Display Processing for the User Devices and Terminals>

In the Second Embodiment, in addition to step S901 through step S914, which are the initial display processing for the user device 104 and the terminal 105 of the First Embodiment, initial display processing is also executed for the user device 106 and the terminal 107.

The initial display processing for the user device 106 and the terminal 107 is the same as the initial display processing for the user device 104 and the terminal 105, and therefore, an explanation thereof will be omitted.

<Screen Connection Processing for the User Devices>

In the Second Embodiment, in addition to step S1201 through step S1205, which are the processing for connecting the screen for the user device 104 and the screen for the terminal 105 according to the First Embodiment, processing is also executed to connect the screen for the user device 106 and the screen for the terminal 107.

The processing to connect the screen for the user device 106 and the screen for the terminal 107 is the same as the processing for connecting the screen for the user device 104 and the screen for the terminal 105, and therefore, an explanation thereof will be omitted.

<Print Job Creation Processing>

Next, an explanation will be given of the processing for creating a print job by accessing a screen that is displayed on the terminal 107 from the user device 104 while referencing FIG. 22 through FIG. 27.

FIG. 22 through FIG. 26 are sequence diagrams showing examples of processing that are executed by the printing system according to the Second Embodiment. The processing that is shown in FIG. 22 through FIG. 26 is realized by the CPU 601 of the provision system 102, the CPU 601 of the print management server 103, and the CPUs 201 of each of the user device 104, the terminal 105, the user device 106, and the terminal 107 reading out and executing programs.

Conversely, the processing that is shown in FIG. 22 through FIG. 26 may also be realized by hardware such as an ASIC, an electronic circuit, or the like that is installed in this hardware.

FIGS. 27A to 27E are diagrams showing examples of a screen that is displayed on a display of a user device according to the Second Embodiment. Specifically, FIG. 27 shows a screen transition from a display of a virtual conference room to a print job creation results screen.

Figure 27A:
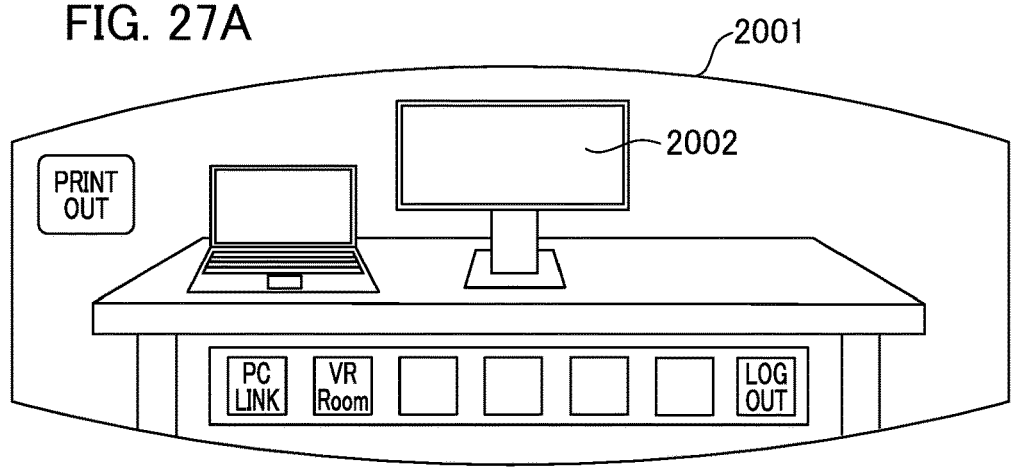
FIG. 27A to FIG. 27E are diagrams showing examples of screens that are displayed on the display of the user device according to the Second Embodiment.
Figure 27B:
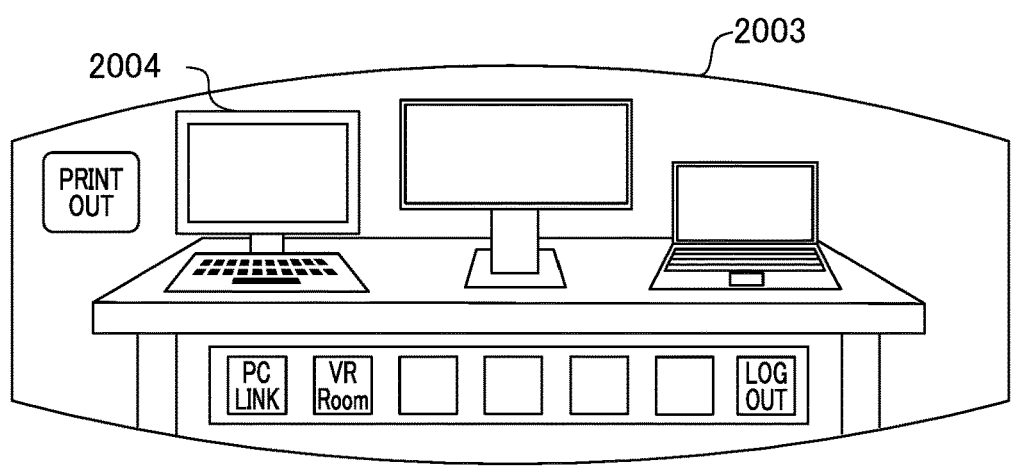

FIG. 27A shows a post entrance screen 2001. The post entrance screen 2001 includes a projection-use virtual screen 2002 in addition to the elements that configure the post screen connection screen 1304. FIG. 27B shows a post entrance screen 2003 that is displayed on the user device 106 after the user has entered the virtual conference room using the user device 104, and the person projecting the file has entered the virtual conference room using the user device 106.

The post entrance screen 2003 includes a virtual terminal object 2004 for the terminal 107 that is connected to the user device 106 in addition to the elements that configure the post entrance screen 2001.

Figure 27C:
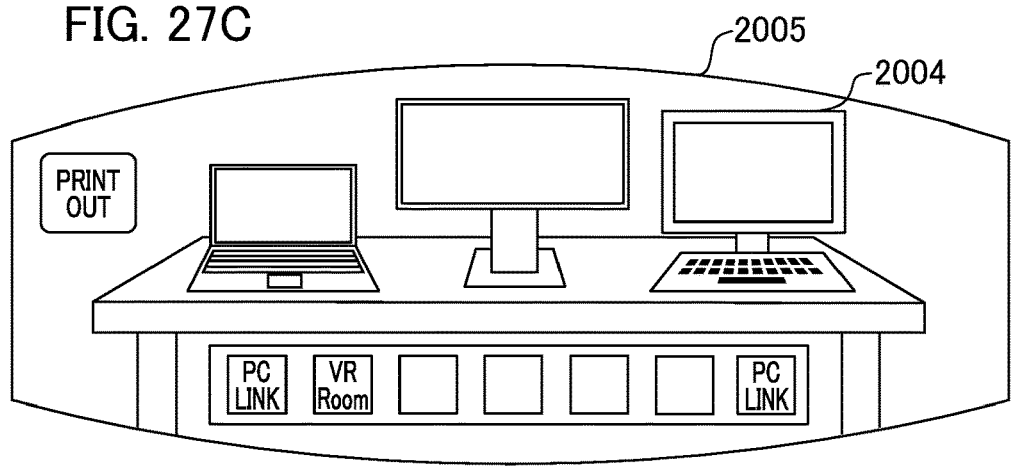

FIG. 27C shows post entrance screen 2005 that is displayed on the use device 104 when the user of the user device 106 has entered the virtual conference room after the user of the user device 104 has entered the virtual conference room. The post entrance screen 2005 includes the virtual terminal object 2004 for the terminal 107 that is connected to the user device 106 in addition to the elements that configure the post entrance screen 2001.

Figure 27D:
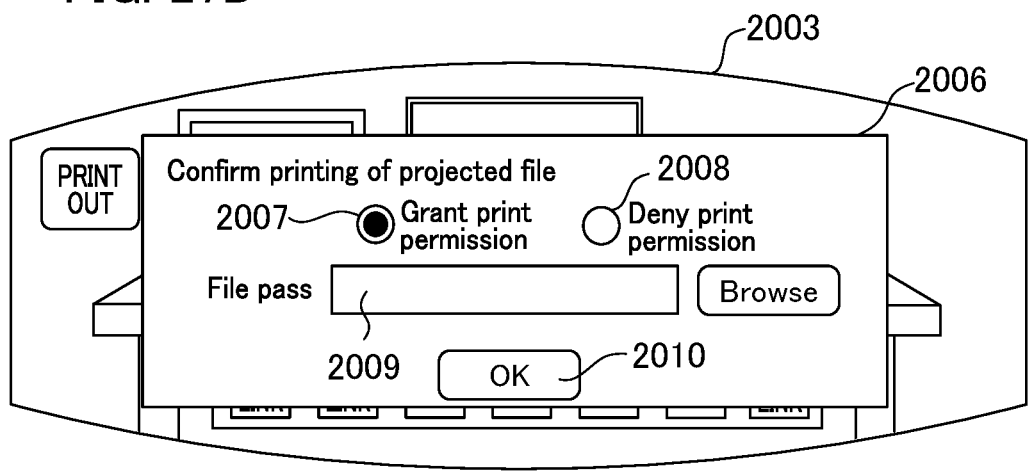

FIG. 27D shows a state in which a print permission confirmation screen 2006 has been displayed as a dialogue on the post entrance screen 2003 on the display 208 of the user device 106. The print permission confirmation screen 2006 may also by displayed by transitioning the screen from the post entrance screen 2003.

The print permission confirmation screen 2006 includes a grant print permission radio button 2007, a deny print permission radio button 2008, a file pass input line 2009, and an OK button 2010. In a case in which the file pass input line 2009 has not been input, the OK button 2010 enters an inactive state in which it cannot be pressed, and in a case in which the file pass input line 2009 has been input, it enters an active state in which this button can be pressed.

Figure 27E:
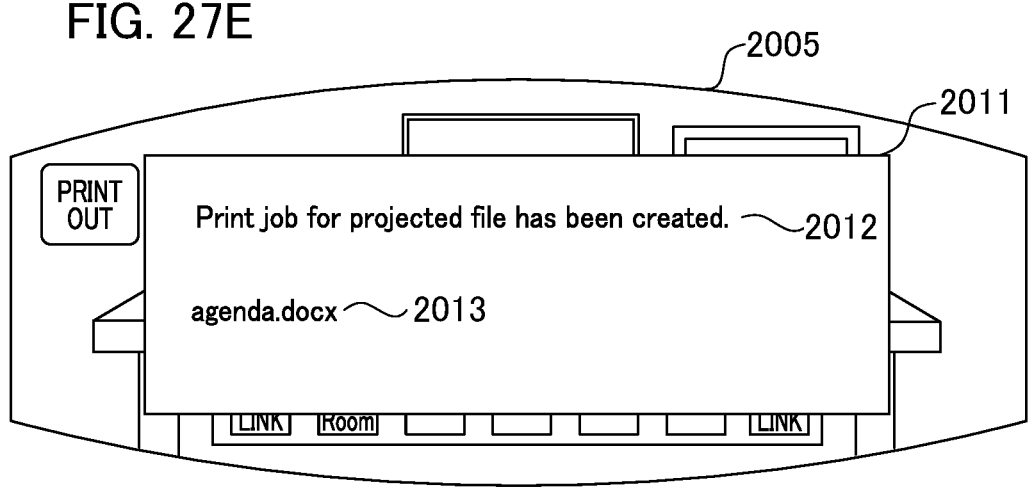

FIG. 27E shows a state in which a print job creation results screen 2011 is displayed as a dialogue on the post entrance screen 2005 on the display 208 of the user device 104 when print permission has been granted for the printing of the projected file, and a print job has been created.

The print job creation results screen 2011 may also be displayed by screen transitioning from the post entrance screen 2005. The print job creation results screen 2011 includes a print job creation results message 2012, and a projection file name 2013.

During step S1901, in a case in which it has been detected that the enter virtual conference room button 1010 has been pressed via the operating unit 305, the application unit 306 transmits an entrance request for the virtual conference room corresponding to the user ID to the provision system 102 via a communications unit 301.

During step S1902, the provision system 102 executes entrance processing for the virtual conference room relating to the user ID that was received from the user device 104 via the authentication control unit 703.

During step S1903, the provision system 102 returns the entrance results for the virtual conference room to the user device 104 via the communications unit 701.

During step S1904, the application unit 306 displays the post entrance screen 2001 via the display unit 304.

During step S1905 through step S1907, the user device 106 executes the same processing as step S1901 through step S1903.

During step 1908, the application unit 306 displays the post entrance screen 2003 via the display unit 304.

During step S1909, the application unit 306 displays the post update post entrance screen 2005 via the display unit 304.

During step S1910, in a case in which an operation to project a file from the user of the terminal 107 has been detected via the operating unit 305, the application unit 306 renders the contents of the file on the projection-use virtual screen 2002.

In addition, this is rendered on the projection-use virtual screen 2002 of the user device 104 in the same manner as it was for the user device 106 through the provision system 102 via the display unit 304 of the user device 104.

During step S1911, the application unit 306 detects an operation to send a file to the virtual print reception object 1006 from the projection-use virtual screen 2002 via the operating unit 305.

The processing for step S1912 through step S1916 is the same as the processing for step S1402 through step S1406 according to the First Embodiment, During step S1917, the application unit 306 transmits a request to the provision system 102 to confirm if there is permission to print from the projection source of the projection-use virtual screen 2002 via the communications unit 301.

During step S1918, the provision system 102 transmits a request to the user device 106, which is the projection source for the projection use virtual screen 2002 to confirm permission to print via the communications unit 701 based on the request to confirm permission to print that was received from the user device 104.

During step S1919, the application unit 306 displays the print permission confirmation screen 2006 via the display unit 304.

During step S1920, in a case in which the application unit 306 has detected that the OK button 2010 has been pressed via the operating unit 305, the application unit 306 determines if this is a state in which the grant print permission radio button 2007 or the deny print permission radio button 2008 has been selected.

In addition, in a case in which the application unit 306 has determined that the grant print permission radio button has been selected, it closes the print permission confirmation screen, sets the value that was input into the file pass input line 2009 as the print target file name on the storage unit 302, and the processing proceeds to step S1921. In addition, in a case in which the application unit 306 has determined that the deny print permission button has been selected, it closes the print permission confirmation screen 2006, and the processing proceeds to step S1924.

During step S1921, the application unit 306 transmits a command to transmit a copy of the file for the terminal 107 that corresponds to the print target file pass that was set in the storage unit 302 to the terminal 105 via the communications unit 301.

During step 1922, the application unit 306 transmits the file corresponding to the print target file pass to the terminal 105 via the communications unit 301 based on the command to perform printing that was received from the user device 106.

During step S1923, the application unit 306 transmits the user ID, along with the file that was received from the terminal 107 to the print management server 103 via the communications unit 301.

During step S1924, the application unit 306 returns the results of confirming the permission to print to the user device 104 via the communications unit 301.

The processing from step S1925 through step S1930 is the same as the processing from step S1407 through step S1412 according to the First Embodiment.

During step S1931, in the case in which a print job has been created for the file that was indicated on the print target file pass input screen 1501 during step S1913, the application unit 306 displays a print job creation results screen 1505 via the display unit 304.

In a case in which a print job has been created for a projection file by a determination that the grant printing permission radio button 2007 was selected on the print permission confirmation screen 2006 during step S1920, the application unit 306 displays a print job creation results screen 2011.

In addition, in a case in which a print job for a screenshot file has been created by the determination that the deny print permission radio button 2008 has been selected on the print permission confirmation screen 2006 during step S1920, the application unit 306 displays the print job creation results screen 1507.

Note that during step S1926 through step S1929, the provision system 202 may also take a form in which the URL that has been saved for the screenshot file is transmitted to the print management server 103 through the client terminal 104, thereby making a print command, in the same manner as for step S1408 through step S1411 according to the First Embodiment.

In addition, the storage destination for the screenshot file may also be the provision system 102, or it may also be an external storage service.

As has been explained above, it is possible for a print job to be created on the print management server 103 with respect to a file that has been projected onto a projection-use virtual screen of a virtual conference room, or a screenshot file thereof.

<Printing Processing>

The printing processing for the Second Embodiment is the same as step S1701 through step S1712, which is the printing processing according to the First Embodiment.

As has been explained above, according to the Second Embodiment, it is possible to print a file that was projected onto a projection-use virtual screen of a virtual conference room, or a screenshot of the contents that were projected.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the printing system or the like through a network or various storage media. Then, a computer (or a CPU, an MPU, or the like) of the printing system or the like may be configured to read and execute the program. In such a case, the program and the storage medium storing the program configure the present invention.

In addition, the present invention also includes articles that are realized by using, for example, at least one processor or circuit configured to function as the embodiment explained above. Note that a plurality of processors may also be used, and distributed processing may also be performed.

This application claims the benefit of Japanese Patent Application No. 2022-187594, filed on Nov. 24, 2022, which is hereby incorporated by reference herein in its entirety.

What is claimed is:

1. A printing system including a provision system configured to provide a virtual space, a head mounted display for a user to experience the virtual space, and a printing apparatus, wherein:
the provision system has at least one processor or circuit configured to function as:
a reception unit configured to receive operations to print contents corresponding to objects that exist in the virtual space in accordance with operations that the user has executed in the virtual space;
the head mounted display has at least one processor or circuit configured to function as:
an output unit configured to control so that print data corresponding to the contents in response to the operation to print the contents having been received by the reception unit is output to a print management system that manages the print data; and
the printing apparatus has at least one processor or circuit configured to function as:
a print control unit configured to acquire the print data from the print management system and print the print data.

2. The print system according to claim 1, wherein the print data includes data showing a video image corresponding to the virtual space that the user experienced using the head mounted display.

3. The print system according to claim 1, wherein the print control unit prints the contents by acquiring the print data in response to an operation from the user that commands the printing apparatus to print the print contents.

4. The print system according to claim 1, wherein the output unit is further configured to transmit, to the print management system, print data showing a screenshot of the contents is acquired from the provision system.

5. A printing method relating to a provision system that provides a virtual space, a head mounted display for a user to experience the virtual space, and a printing apparatus, wherein,
an operation to print contents corresponding to an object that exists in the virtual space is received from the provision system according to an operation that has been executed by the user in the virtual space;
print data corresponding to the contents is output to a print management system that manages the print data by the head mounted display in response to the reception unit having received the operation to print the contents; and the print data is acquired from the print management system and the print data is printed.

6. A non-transitory computer-readable storage medium configured to store a computer program to control a provision system that provides virtual space, a head mounted display for a user to experience the virtual space, and a printing apparatus, wherein the computer program comprises instructions for executing the following processes:

the provision system receiving an operation to print contents corresponding to an object that exists in the virtual space according to an operation that has been executed by the user in the virtual space;

the head mounted display outputting to a print management system that manages the print data the print data corresponding to the contents in response to the reception unit having received the operation to print the contents; and the printing apparatus acquiring the print data from the print management system and printing the print data.

7. A printing system including a provision system configured to provide a virtual space, a user device for a user to experience the virtual space, a printing apparatus, and a terminal that is associated with the user, wherein:

the provision system has at least one processor or circuit configured to function as:

a reception unit configured to receive operations to print contents corresponding to objects that exist in the virtual space in accordance with operations that the user has executed in the virtual space; the user device has at least one processor or circuit configured to function as:

an output unit configured to output, to a print management system that manages print data, print data corresponding to the contents in response to the operation to print the contents having been received by the reception unit; and the printing apparatus has at least one processor or circuit configured to function as:

a print control unit configured to acquire the print data from the print management system to print the contents as the print data, wherein the output unit is further configured to transmit, to the terminal, command data for transmission of data corresponding to the contents exist on the terminal, and wherein the terminal is configured to output, to the print management system, the data corresponding to the contents in response to the command data.

8. The print system according to claim 7, wherein the user device includes a head mounted display that allows the user to experience the virtual space.

9. A method of controlling a printing system including a provision system configured to provide a virtual space, a user device for a user to experience the virtual space, a printing apparatus, and a terminal that is associated with the user, the method including:

receiving operations to print contents corresponding to objects that exist in the virtual space in accordance with operations that the user has executed in the virtual space;

outputting, by an output unit, to a print management system that manages print data, print data corresponding to the contents in response to the operation to print the contents having been received by the reception unit; and acquiring, by the printing apparatus, the print data from the print management system to print the contents as the print data, transmitting, by the output unit, to the terminal, command data for transmission of data corresponding to the contents exist on the terminal, and outputting, from the terminal, to the print management system, the data corresponding to the contents in response to the command data.

* * * * *